United States Patent
Bamberger et al.

(10) Patent No.: US 6,608,000 B1
(45) Date of Patent: Aug. 19, 2003

(54) POLYMERIZATION CATALYSTS, THEIR PRODUCTION AND USE

(75) Inventors: Robert Lee Bamberger, Crosby, TX (US); Moses Olukayode Jejelowo, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 263 days.

(21) Appl. No.: 09/661,414

(22) Filed: Sep. 13, 2000

Related U.S. Application Data

(60) Division of application No. 08/668,868, filed on Jun. 24, 1996, now Pat. No. 6,143,854, which is a continuation of application No. 08/284,340, filed on Aug. 2, 1994, now abandoned, and a continuation-in-part of application No. 08/246,911, filed on May 20, 1994, now abandoned, and a continuation-in-part of application No. 08/246,914, filed on May 20, 1994, now abandoned, and a continuation-in-part of application No. 08/190,718, filed on Feb. 1, 1994, now Pat. No. 5,359,015, which is a continuation-in-part of application No. 08/103,505, filed on Aug. 6, 1993, now abandoned, and a continuation-in-part of application No. 07/865,579, filed on Apr. 9, 1992, now Pat. No. 5,281,679.

(51) Int. Cl.[7] ............... B01J 31/00; B01J 37/00; C08F 4/02; C08F 4/60
(52) U.S. Cl. ............ 502/113; 502/152; 502/153; 502/103; 502/117
(58) Field of Search ................. 502/113, 153

(56) References Cited

U.S. PATENT DOCUMENTS

| | | | |
|---|---|---|---|
| 4,530,914 A | * 7/1985 | Ewen et al. | 502/113 |
| 4,543,399 A | 9/1985 | Jenkins, III et al. | 526/70 |
| 4,588,790 A | 5/1986 | Jenkins, III et al. | 526/70 |
| 4,665,208 A | 5/1987 | Welborn, Jr. et al. | 556/179 |
| 4,808,561 A | 2/1989 | Welborn, Jr. | 502/104 |
| 4,871,705 A | 10/1989 | Hoel | 502/117 |

(List continued on next page.)

FOREIGN PATENT DOCUMENTS

| | | | |
|---|---|---|---|
| EP | 0129368 | 12/1984 | C08F/10/00 |
| EP | 0277003 | 8/1988 | C08F/4/64 |
| EP | 0277004 | 8/1988 | C08F/4/64 |

(List continued on next page.)

OTHER PUBLICATIONS

Wild et al., entitled "Determination of Branching Distributions in Polyethylene and Ethylene Copolymers", Journal of Polymer Science, Polymer Physics Edition, vol. 20, pp. 441–455 (1982).
USSN: 07/885,170 entitled "Controlled Particle Size Polyolefins from Silica Supported Prepolymerized Metallocene Catalyst" filed May 18, 1992.
USSN: 08/053,067 entitled "Process for Polymerizing Monomers in Fluidized Beds" filed Apr. 26, 1993.

*Primary Examiner*—Mark L. Bell
*Assistant Examiner*—J. Pasterczyk
(74) *Attorney, Agent, or Firm*—Stephen D. Prodnuk; Jaimes Sher

(57) ABSTRACT

The invention generally relates to a metallocene-based, olefin polymerization catalyst system. The easily processible polymer product has a broad molecular weight distribution, a high molecular weight, and a narrow composition distribution. The catalyst system comprises a first component with a Group-4–6 metal bonded to cyclopentadienyl-containing rings having at least two substituents bonded to the rings in the same position; a second component comprising a Group-4–6 metal bonded to cyclopentadienyl-containing rings having at least two substituents bonded to the rings; and a third component comprising a Group-4–6 metal bonded to cyclopentadienyl-containing rings where one of the rings is substituted identically to the first component and another is substituted identically to the second component. When the substituents of the first and second components are the same, they are bonded to the first component rings at positions different from the bonding positions of the second component rings.

11 Claims, 7 Drawing Sheets

U.S. PATENT DOCUMENTS

| | | | |
|---|---|---|---|
| 4,897,455 A | | 1/1990 | Welborn, Jr. .................. 526/129 |
| 4,912,075 A | | 3/1990 | Chang ......................... 502/107 |
| 4,921,825 A | | 5/1990 | Kioka et al. ................. 502/104 |
| 4,923,833 A | | 5/1990 | Kioka et al. ..................... 502/9 |
| 4,924,018 A | | 5/1990 | Bottelberghe ............... 556/179 |
| 4,935,474 A | * | 6/1990 | Ewen et al. ................. 526/114 |
| 4,937,217 A | | 6/1990 | Chang ......................... 502/111 |
| 4,937,299 A | | 6/1990 | Ewen et al. ................. 526/119 |
| 4,937,301 A | | 6/1990 | Chang ......................... 526/128 |
| 4,939,217 A | * | 7/1990 | Stricklen .................... 502/113 |
| 4,952,540 A | | 8/1990 | Kioka et al. ..................... 502/9 |
| 5,008,204 A | | 4/1991 | Stehling ........................ 436/85 |
| 5,008,228 A | | 4/1991 | Chang ......................... 502/111 |
| 5,017,714 A | | 5/1991 | Welborn, Jr. .................. 556/12 |
| 5,028,670 A | | 7/1991 | Chinh et al. .................. 526/73 |
| 5,055,438 A | | 10/1991 | Canich ........................ 502/117 |
| 5,057,475 A | | 10/1991 | Canich et al. .............. 502/104 |
| 5,064,797 A | * | 11/1991 | Stricklen .................... 502/113 |
| 5,064,802 A | | 11/1991 | Stevens et al. ............. 502/155 |
| 5,086,025 A | | 2/1992 | Chang ......................... 502/117 |
| 5,096,867 A | | 3/1992 | Canich ........................ 502/103 |
| 5,103,031 A | | 4/1992 | Smith, Jr. ................... 556/179 |
| 5,120,867 A | | 6/1992 | Welborn, Jr. .................. 556/12 |
| 5,147,949 A | | 9/1992 | Chang ......................... 526/129 |
| 5,149,819 A | | 9/1992 | Satoh et al. ................. 548/149 |
| 5,153,157 A | | 10/1992 | Hlatky et al. ............... 502/117 |
| 5,198,401 A | | 3/1993 | Turner ........................ 502/155 |
| 5,206,199 A | | 4/1993 | Kioka et al. ................. 502/117 |
| 5,227,440 A | | 7/1993 | Canich et al. .............. 526/129 |
| 5,235,081 A | | 8/1993 | Sangokoya .................. 556/179 |
| 5,238,892 A | | 8/1993 | Chang ......................... 502/111 |
| 5,239,022 A | | 8/1993 | Winter et al. ............... 526/127 |
| 5,243,001 A | | 9/1993 | Winter et al. ............... 526/127 |
| 5,264,405 A | | 11/1993 | Canich ........................ 502/103 |
| 5,272,236 A | | 12/1993 | Lai et al. .................. 526/348.5 |
| 5,276,208 A | | 1/1994 | Winter et al. ................. 556/53 |
| 5,278,272 A | | 1/1994 | Lai et al. .................. 526/348.5 |
| 5,281,679 A | * | 1/1994 | Jejelowo et al. ............. 502/113 |
| 5,296,434 A | | 3/1994 | Karl et al. ................... 502/117 |
| 5,304,614 A | | 4/1994 | Winter et al. ............... 526/127 |
| 5,321,106 A | | 6/1994 | LaPointe ..................... 526/126 |
| 5,324,800 A | | 6/1994 | Welborn, Jr. et al. ........ 526/160 |
| 5,359,015 A | * | 10/1994 | Jejelowo ..................... 502/113 |
| 5,470,811 A | * | 11/1995 | Jejelowo et al. ............. 502/117 |
| 5,534,473 A | * | 7/1996 | Welch et al. ................ 502/113 |
| 5,847,059 A | * | 12/1998 | Shamshoum et al. ....... 502/113 |
| 5,986,024 A | * | 11/1999 | Wilson, Jr. .................. 502/113 |
| 6,072,014 A | * | 6/2000 | Wilson, Jr. .................. 502/113 |
| 6,143,683 A | * | 11/2000 | Shamshoum et al. ....... 502/113 |
| 6,143,854 A | * | 11/2000 | Bamberger et al. ...... 526/348.1 |
| 6,362,125 B1 | * | 3/2002 | Shamshoum et al. ....... 502/152 |
| 6,403,520 B1 | * | 6/2002 | Hamed et al. ............... 502/113 |
| 6,410,474 B1 | * | 6/2002 | Nowlin et al. .............. 502/113 |
| 6,417,130 B1 | * | 7/2002 | Mink et al. ................. 502/113 |
| 6,420,298 B1 | * | 7/2002 | Mink et al. ................. 502/113 |
| 6,518,215 B1 | * | 2/2003 | Bamberger et al. ......... 502/113 |

FOREIGN PATENT DOCUMENTS

| | | | | |
|---|---|---|---|---|
| EP | | 0279863 | 8/1988 | ........... C08F/10/00 |
| EP | | 0 310 734 | * 4/1989 | |
| EP | | 0 316 155 | * 5/1989 | |
| EP | | 0420436 | 4/1991 | ............. C07F/7/00 |
| EP | | 0578838 | 1/1994 | ........... C08F/10/00 |
| EP | | 0520732 | 12/1995 | ........... C08F/10/00 |
| WO | | WO9104257 | 4/1991 | ............. C07F/7/00 |
| WO | | WO9200333 | 1/1992 | ............. C08F/4/76 |
| WO | | WO9308199 | 4/1993 | ............. C07F/7/28 |
| WO | | WO9308221 | 4/1993 | ........... C08F/10/00 |
| WO | | WO9403506 | 2/1994 | ............. C08F/4/64 |
| WO | | WO9407927 | 4/1994 | ........... C08F/10/00 |
| WO | | WO9407928 | 4/1994 | ........... C08F/10/02 |

* cited by examiner

POLYMERIZATION CATALYSTS, THEIR PRODUCTION AND USE

CROSS-REFERENCE TO RELATED PATENT AND PATENT APPLICATIONS

This application is a divisional of U.S. application Ser. No. 08/668,868, filed Jun. 24, 1996, U.S. Pat. No. 6,143,854, which is a continuation of U.S. application Ser. No. 08/284,340, filed Aug. 2, 1994, now abandoned, which is a continuation-in-part of U.S. application Ser. No. 08/103,505, filed Aug. 6, 1993, now abandoned, and U.S. application Ser. No. 07/865,579, filed Apr. 9, 1992 now U.S. Pat. No. 5,281,679 and U.S. application Ser. Nos. 08/246,911 and 08/246,914, both filed May 20, 1994, now abandoned and U.S. application Ser. No. 08/190,718, filed Feb. 1, 1994, U.S. Pat. No. 5,359,015, all of which are incorporated by reference.

FIELD OF THE INVENTION

This invention relates to catalysts, catalyst systems and to methods for their production and use in olefin polymerization. This invention particularly relates to metallocene catalysts and systems useful for the polymerization and copolymerization of alpha-olefins and to high melt strength polymers and products and applications therefrom.

BACKGROUND OF THE INVENTION

Commercial polyethylenes generally fall into one of two general categories based on their processability and their product properties.

Processability is the ability to predict and economically process and shape a polymer uniformly. Processability involves such elements as thermal stability, how easily the polymer flows, melt strength, and whether or not the extrudate is distortion free. Linear polyethylene (LPE) is more difficult to process than low density polyethylenes (LDPE) because LPE's are not as thermally stable, LPE's require more motor power and produce higher extruder pressures to match the extrusion rate of LDPE's. LPE's also have lower melt strength which, for example, adversely affects bubble stability during blown film extrusion, and they are prone to melt fracture at commercial shear rates. On the other hand, however, LPE's exhibit superior physical properties as compared to LDPE's.

In order to take advantage of the superior physical and mechanical properties of LPE's, expensive antioxidants and processing aids must be added to the polymer, and extrusion equipment must be modified to achieve commercial extrusion rates.

It is common practice in the industry to add low levels of an LDPE to an LPE to increase melt strength, to increase shear sensitivity, i.e., to increase flow at a given horse power; and to reduce the tendency to melt fracture. However, these blends generally have poor mechanical properties as compared with neat LPE.

A second technique to improve the processability of LPE's is to broaden the products' molecular weight distribution (MWD) by blending two or more LPE's with significantly different molecular weights, or by changing to a polymerization catalyst which produces broad MWD. The physical and mechanical properties and the processability of these broader MWD products are generally intermediate between those of narrower LPE components and LDPE/LPE blends with equivalent Mw.

Therefore, a need exists for catalyst which offers the processability of blends but the properties of the linear blend components.

BRIEF DESCRIPTION OF THE DRAWINGS

The foregoing aspects, features and advantages of the invention will become clearer and more fully understood when the following detailed description is read in conjunction with the figures, in which.

SUMMARY OF THE INVENTION

Figure 1:
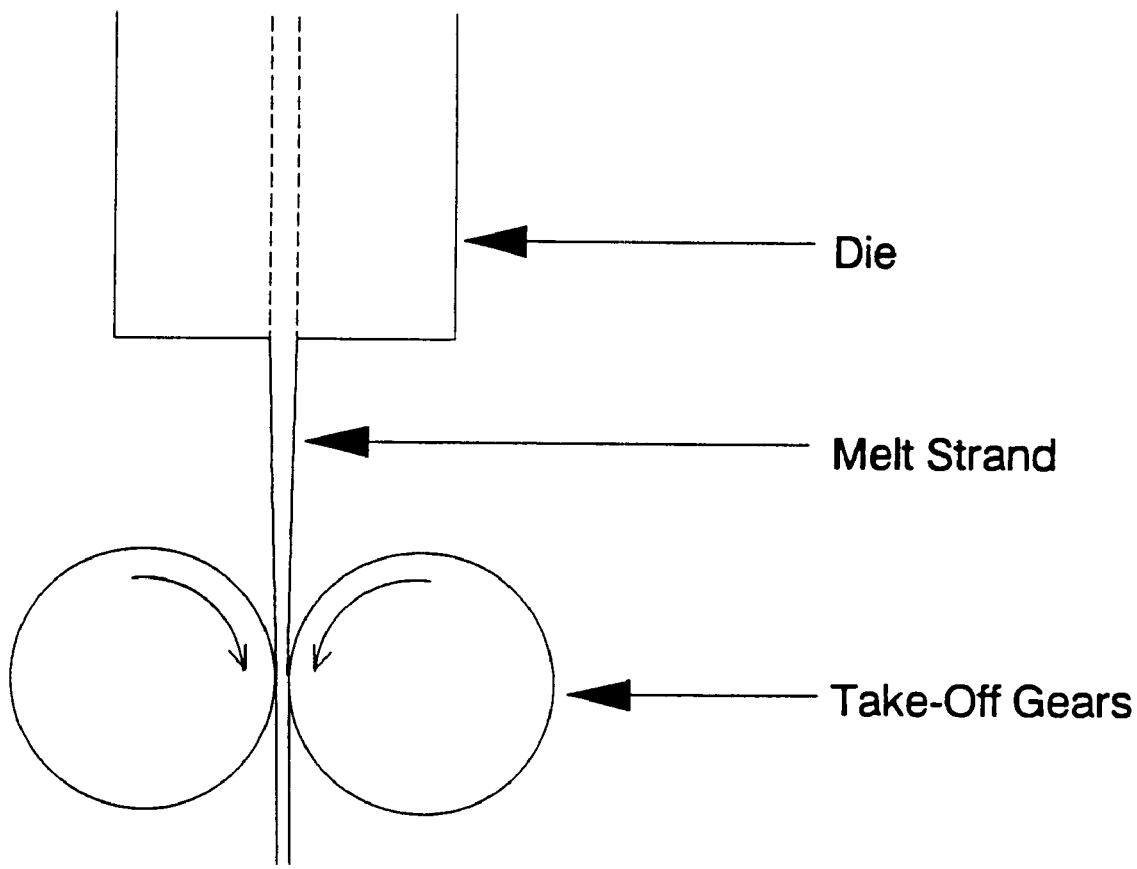
FIG. 1 is a schematicized partial side view of a Gotterfert Rheotens Melt Strength Apparatus.
Figure 2:
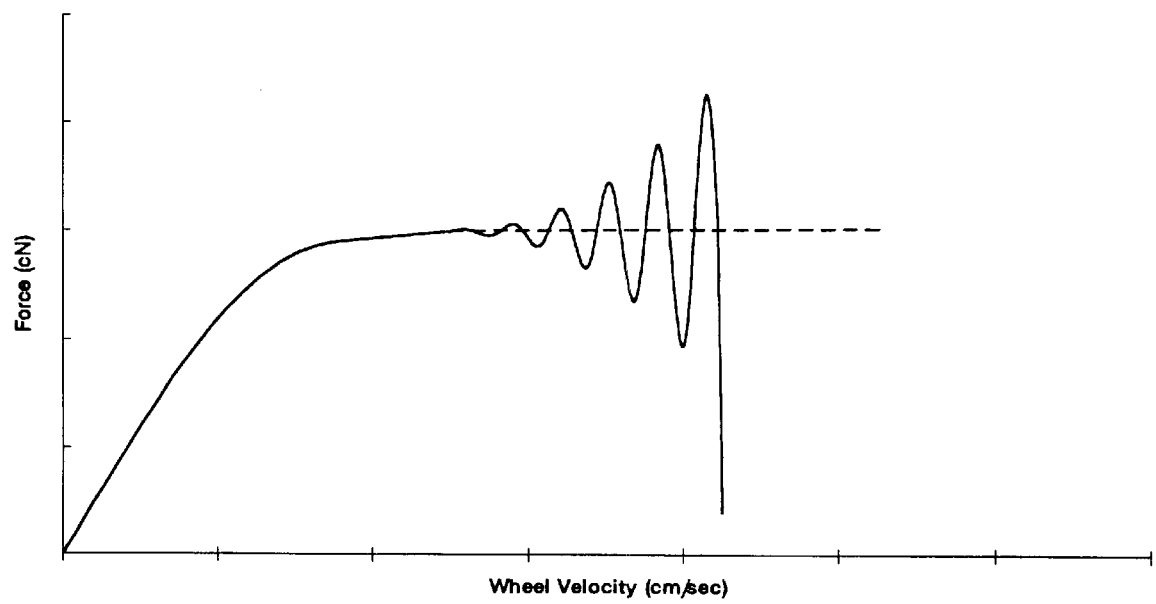
FIG. 2 is a graph of the Melt Strength as a function of the test apparatus wheel velocity.
Figure 3:
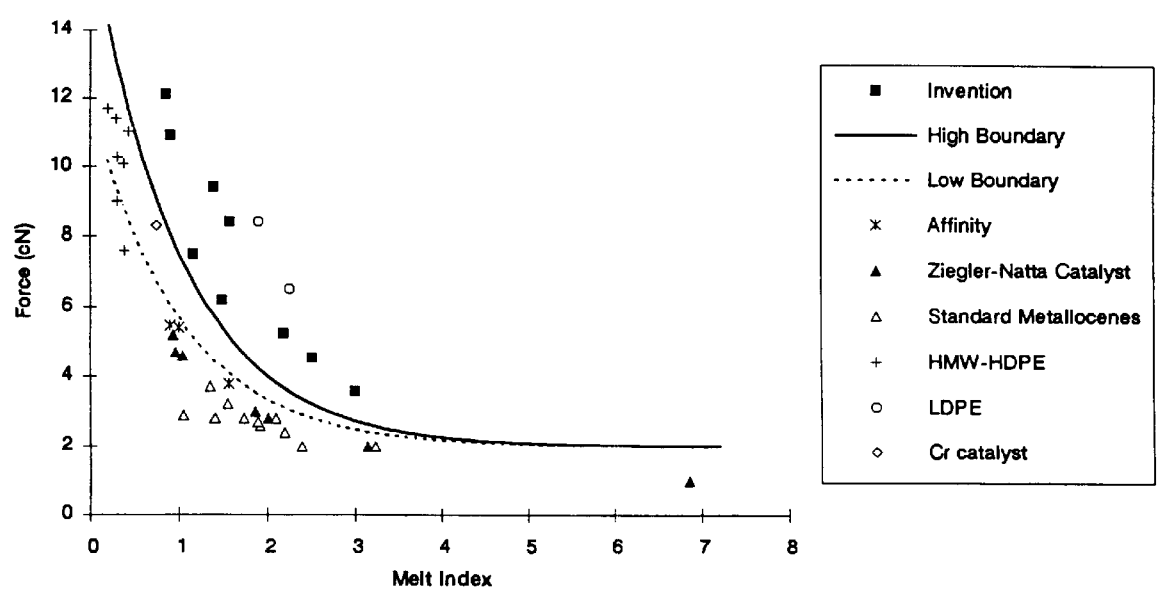
FIG. 3 is a graph of melt strength as a function of melt index.

This invention is directed toward the polymerization of olefins, optionally with a comonomer in the presence of metallocene catalyst to produce a polymer product having a controlled molecular weight distribution, ranging from narrow to broad, a high molecular weight and a narrow composition distribution.

The catalyst of the invention provides for linear polyethylenes and ethylene-α-olefin copolymers with substantially higher melt strength than linear polyethylenes produced with a conventional Ziegler-Natta catalyst or a typical metallocene catalyst. These polyethylenes and copolymers flow in an extruder more easily than their analogs and have superior mechanical properties to polymers produced with post-reactor blending.

In one embodiment the invention provides a catalyst for polymerizing olefins comprising a first component comprising at least one transition metal of Group IV, V or VI and bonded to at least two cyclopentadienyl containing rings, said rings each having at least two substituents bonded to each of said rings in the same position; a second component comprising said transition metal and said cyclopentadienyl containing rings, said rings each having at least two substituents bonded to each of said rings in the same or different position than said substituents of said first component; said substituents of the said first and second components can be the same or different, with the provision that when the substituents of said first and second components are the same, said substituents of said components are bonded to said rings in different positions; and a third component comprising said transition metal bonded to said cyclopentadienyl containing rings where one of said rings is substituted identically as said first component and another of said rings is substituted identically as said second component. In one embodiment the substituents are hydrocarbyl substituents.

The invention further provides for catalyst systems comprising the catalyst component above in combination with a cocatalyst and/or activator for the catalyst. The cocatalyst or activator can be either alumoxane or an ionic activator.

In yet another embodiment the catalyst is supported.

In one embodiment of the invention, there is provided a process for producing polyolefins by contacting olefin monomer, optionally with comonomer in the presence of the catalyst system above The invention also provides for the production of polymers with high melt strengths that are easily processable through a die when making film. The polymers of the invention are more readily extrudable through a die than their conventional Ziegler-Natta analogs. Further, the invention provides for a film, particularly a blown film, that has a unique combination of physical properties.

DETAILED DESCRIPTION OF THE INVENTION

Introduction

This invention is generally directed toward a catalyst useful for polymerizing and copolymerizing olefins. The polymers produced have unique properties making them easily processable without the need for blending to increase processability.

The catalyst of the invention is classified generally in the field of transition metal catalysis. Over the past few years a new catalyst technology has developed, which provides for the modification and/or control over the properties and characteristics of a polymer. This technology generally involves the use of single-site catalysts to produce a broad range of polymers generally having a narrow molecular weight distribution (NMWD) and a narrow composition distribution (NCD). The art has focused on many types of catalysts and catalyst systems. A catalyst that produces a polymer having both a broad molecular weight distribution (BMWD), a high molecular weight (HMW) and a NCD has gone unknown until now.

Traditionally in the art metallocene catalyst are utilized in their pure form requiring many purification steps. In some instances these pure catalysts are combined together to produce a polymer having a bimodal MWD. This invention provides in one embodiment a method for producing the commercially viable catalyst of the invention in an inexpensive and simple manner.

Catalyst Systems and Methods for their Production

For the purposes of this patent specification the term "metallocene" is defined to mean two or more cyclopentadienyl containing rings in combination with a transition metal. More particularly, the metallocene of the invention contains two or more substituted rings in combination with a Group IV, V or VI transition metal.

In one embodiment the catalyst for polymerizing olefins of the invention comprises a first component comprising at least one transition metal of Group IV, V or VI and at least two cyclopentadienyl containing rings, said rings each having at least two substituents bonded to each of said rings in the same position; and a second component comprising said transition metal and said rings such that said substituents are bonded to each of said rings in a different position than said substituents of said first component such that said substituents on each of said rings in said second component are in the same position; and a third component comprising said transition metal and said rings such that said substituents are bonded to one of said rings in the same position as said first component and said substituents of another of said rings bonded in the same position as said second component.

In another embodiment, the metallocene catalyst of the invention is represented by the general formula $T_b(R_sL)_r MD_dA_a$ wherein L is a cyclopentadienyl containing ring, M is a group IV, V or VI transition metal, R is a hydrocarbyl, alkoxy, silyl, siloxy group or a halogen or two carbon atoms joined together to form a part of a $C_4$ to $C_6$ ring; A is a halogen, D is a hydrocarbyl radical, a arylalkyl radical, an alkylidene or a hydrocarboxy radical; and T is a radical bridging two L rings, where T contains a carbon, a germanium, a silicon, a phosphorous or a nitrogen atom or combination thereof; r is 2 to 3, b is 0 to 5; s is 2 to 5; d is 0 to 2; a is 0 to 2; and r+d+a is equal to the oxidation state of M.

In another embodiment the catalyst of the invention is represented by the following formulas:

  a)

and

  b)

and

  c)

where $R^1$ is a hydrocarbyl substituent, $R^a$ and $R^b$ are the same hydrocarbyl substituents and are either the same or different from $R^1$; $L^a$ and $L^b$ are each a cyclopentadienyl containing ring; M is a transition metal of Group IV, V or VI; X is a halogen and/or hydrocarbyl radical; x is an integer from 2 to 4; $R^a$ and $R^b$ are bonded to their respective $L^a$ and $L^b$ at different positions; and where x is 4, $R^1$ is different from $R^a$ and $R^b$.

In still yet another embodiment the metallocene catalyst of the invention includes its representative isomers; namely, constitutional isomers, stereoisomers, configurational isomers, geometric isomers, enantiomers and diasteriomers of the metallocene.

Metallocenes selected to have a good comonomer incorporation, hydrogen sensitivity and polymerization activity are preferred. The preferred metallocenes are those metallocenes having two to five substituents on the cyclopentadienyl rings, more preferably two to three substituents and most preferably two substituents. The more preferred metallocenes of the invention include those wherein three of the cyclopentadienyl ring protons are substituted with hydrocarbyl groups, for example:

1)
(i) (1-ethyl-2,4-dimethyl Cp)$_2$ZrCl$_2$;
(ii) (1,2-diethyl-4-methyl Cp)$_2$ZrCl$_2$;
(iii) (1-ethyl-3,4-dimethyl Cp)$_2$ZrCl$_2$;
(iv) (1-ethyl-2,4-dimethyl Cp)(1,2-diethyl-4-methyl Cp)ZrCl$_2$;
(v) (1-ethyl-2,4-dimethyl Cp)(1-ethyl-3,4-dimethyl Cp)ZrCl$_2$; and
(vi) (1,2-diethyl-4-methyl Cp)(1-ethyl-3,4-dimethyl Cp)ZrCl$_2$ 2)
(i) (1,2-diethyl4-methyl Cp)$_2$ZrCl$_2$;
(ii) (1,3-diethyl4-methyl Cp)$_2$ZrCl$_2$;
(iii) (1,5-diethyl-4-methyl Cp)$_2$ZrCl$_2$
(iv) (1,2-diethyl4-methyl Cp)(1,3-diethyl-4-methyl Cp)ZrCl$_2$;
(v) (1,2-diethyl-4-methyl Cp)(1,5-diethyl-4-methyl Cp)ZrCl$_2$; and
(vi) (1,3-diethyl-4-methyl Cp)(1,5-diethyl-4-methyl Cp)ZrCl$_2$ The most preferred metallocenes of the invention are those wherein two of the cyclopentadienyl ring protons are substituted with hydrocarbyl groups, for example:

1)
(i) (1,2-methyl ethyl Cp)$_2$ZrCl$_2$;
(ii) (1,3-methyl ethyl Cp)$_2$ZrCl$_2$; and
(iii) (1,2-methyl ethyl Cp)(1,3-methyl ethyl Cp)ZrCl$_2$ For the purposes of this patent specification all the catalysts of the invention can be represented by the following general designation, for example, this particular catalyst of the invention above is represented by $(1,2/1,3\text{-MeEtCp})_2 ZrCl_2$, which catalyst description includes 1) (i), (ii) and (iii).

2)
(i) $(1,2\text{-methyl }^n\text{Propyl Cp})_2 ZrCl_2$;
(ii) $(1,3\text{-methyl }^n\text{Propyl Cp})_2 ZrCl_2$; and
(iii) $(1,2\text{-methyl }^n\text{Propyl Cp})(1,3\text{-methyl }^n\text{Propyl Cp}) ZrCl_2$
3)
(i) $(1,2\text{-methyl }^i\text{Propyl Cp})_2 ZrCl_2$;
(ii) $(1,3\text{-methyl }^i\text{Propyl Cp})_2 ZrCl_2$; and
(iii) $(1,2\text{-methyl }^i\text{Propyl Cp})(1,3\text{-methyl }^i\text{propyl Cp}) ZrCl_2$
4)
(i) $(1,2\text{-methyl }^n\text{Butyl Cp})_2 ZrCl_2$;
(ii) $(1,3\text{-methyl }^n\text{Butyl Cp})_2 ZrCl_2$; and
(iii) $(1,2\text{-methyl }^n\text{Butyl Cp})(1,3\text{-methyl }^n\text{Butyl Cp}) ZrCl_2$
5)
(i) $(1,2\text{-methyl }^i\text{Butyl Cp})_2 ZrCl_2$;
(ii) $(1,3\text{-methyl }^i\text{Butyl Cp})_2 ZrCl_2$; and
(iii) $(1,2\text{-methyl }^i\text{Butyl Cp})(1,3\text{-methyl }^i\text{Butyl Cp}) ZrCl_2$ In a preferred embodiment, for producing the catalyst of the invention one such method involves 1) reaction of monomeric methyl-cyclopentadiene with either sodium, potassium or an alkyl-lithium, and reacting the product with an appropriate alkyl halide. These steps can be repeated to afford the desired substitution of ring protons with the desired hydrocarbyl radical; 2) the appropriately substituted cyclopentadienyl ligand is then reacted with either sodium, potassium or an alkyl-lithium and the reaction product is reacted with the appropriate transition metal compound denoted by $ML_4$ previously defined; 3) The product from above is then purified by crystallization and/or sublimation.

In another embodiment, a method for producing the catalyst of the invention involves 1) reacting the reaction product of monomeric cyclopentadiene (L) and sodium, potassium or an alkyl-lithium with an alkyl halide to form a cyclopentadienyl ligand, formula (RL). This process can then be repeated to form the desired final $R_S L$ ligand previously defined. 2) The desired $R_S L$ ligand previously defined is then reacted with sodium, potassium or an alkyl-lithium and the product therefrom is reacted with a transition metal salt of general formula $ML_4$. 3) The final product is then purified by crystallization and/or sublimation. The above two detailed methods provide for making the preferred catalyst of the invention as a single catalyst. For the purposes of this patent specification, the term "single catalyst" indicates that the three or more component species forming the catalyst of this invention is made simultaneously in one reaction rather than being made individually and then combined.

In one embodiment of the invention the metallocene catalyst of this invention can be used in combination with at least one other metallocene well known in the art to further control the properties of the polymer desired. It is preferred that a ratio of the catalyst of this invention to the other catalyst is preferably 1:19 to 19:1, more preferably 1:3 to 3:1, still more preferably 1:2 to 2:1 and most preferably 1:1.

In another embodiment the three or more components of the catalyst of the invention are each present in an amount greater than 1 mole percent, preferably greater than 2, more preferably greater than 5 and even more preferably greater than 7 and most preferably greater than 10.

In still another embodiment each metallocene component of the invention is made individually by any method known to one of ordinary skill in the art. These individual components can be combined to form the catalyst of the invention.

Exemplary of the development of metallocene catalysts for the polymerization of alpha-olefins is the disclosure of U.S. Pat. Nos. 4,871,705, 4,937,299, 5,017,714, 5,120,867, 5,324,800 and EP-A-0 129 368 published Jul. 26, 1989, all of which are fully incorporated herein by reference. These publications teach the structure of the metallocene catalysts and include alumoxane as the cocatalyst. There are a variety of methods for preparing alumoxane described in U.S. Pat. Nos. 4,665,208, 4,952,540, 5,235,081, 5,103,031, 4,924,018, 5,206,199. Other cocatalysts may be used with metallocenes, such as trialkylaluminum compounds; or ionizing ionic activators or compounds such as tri (n-butyl) ammonium tetra (pentaflurophenyl) boron, which ionize the neutral metallocene compound. Such ionizing compounds may contain an active proton, or some other cation associated with but not coordinated or only loosely coordinated to the remaining ion of the ionizing ionic compound. Such compounds and the like are described in EP-A-0 277 003, EP-A-0 277 004 EP-A-0 520 732, EP-A-0 420 436, PCT International Publication WO 92/00333, WO 94/07928, WO 91/04257 and WO 94/03506 and U.S. Pat. Nos. 5,057,475, 5,096,867, 5,055,438, 5,198,401, 5,227,440, 5,264,405, 5,153,157 and 5,198,401 and are all herein fully incorporated by reference. In additional, the metallocene catalysts useful in this invention can include non-cyclopentadienyl catalyst components, or ancillary ligands such as boroles or carbollides in combination with a transition metal. Additionally it is not beyond the scope of this invention that the catalysts and catalyst systems of the invention could be used in combination with those catalysts and catalyst systems described in U.S. Pat. Nos. 5,064,802, 5,149,819, 5,243,001, 5,239,022, 5,276,208, 5,296,434, 5,321,106 and 5,304,614 and PCT publications WO 93/08221, WO 93/08199 and EP-A-0 578 838, all of which are herein incorporated by reference. All the catalyst systems described above may be, optionally, prepolymerized or used in conjunction with an additive or scavenging component to enhance catalytic productivity, see for example PCT Publication WO 94/07927, incorporated herein by reference.

Combinations of activators are also contemplated by the invention, for example, alumoxane and ionizing activators, see for example, WO 94/07928.

The catalyst in a gas phase process may be supported on any suitable particulate material or porous carrier such as polymeric supports or inorganic oxide for example silica, alumina or both. Methods of supporting the catalyst of this invention are described in U.S. Pat. Nos. 4,808,561, 4,897, 455, 4,937,301, 4,937,217, 4,912,075, 5,008,228, 5,086,025, 5,147,949, 5,238,892 and U.S. application Ser. No. 885,170, filed May 18, 1992, all of which are herein incorporated by reference.

Polymerization Process

The polymerization of olefins utilizing the catalyst of the invention can be conducted in a solution, slurry or gas phase. A gas phase polymerization process is preferred. (See for example U.S. Pat. Nos. 4,543,399, 4,588,790, 5,028,670 and U.S. application Ser. No. 053,067, filed Apr. 26, 1993, all of which are herein incorporated by reference.)

The polymerization or copolymerization process of the invention involves the polymerization of one or more cyclic or acyclic alpha-olefin or polyene monomer(s) having from 2 to 20 carbon atoms, preferably 2–15 carbon atoms.

The invention is particularly well suited to the copolymerization reactions involving the polymerization of one or more of the monomers, for example, alpha-olefin monomers of ethylene, propylene, 1-butene, 1-pentene, 4-methyl-1-pentene, 1-hexene, 1-octene, 1-decene, 1-dodecene, 1-tetradecene, 1-hexadecene, 1-octadecene, 1-eicesene and cyclic olefins and styrene. Other monomers can include polar vinyl, diolefins such as dienes, norbornene, norboradiene, acetylene and aldehyde monomers. Preferably the comonomer is an alpha-olefin having from 3 to 15 carbon atoms, more preferably 4 to 12 carbon atoms.

In one embodiment the monomer is polymerized with at least two comonomers to form a terpolymer and the like.

In the preferred embodiment the monomer is ethylene and at least one comonomer of 1-butene, 1-pentene, 4-methyl-1-pentene, 1-hexene or 1-octene.

In one embodiment of the invention the olefin(s) are prepolymerized in the presence of the catalyst system of the invention prior to the main polymerization, see for example U.S. Pat. Nos. 4,923,833 and 4,921,825 and EP-B-0 279 863, all of which are herein incorporated by reference.

Polymer Properties

The polymer and product properties cited below and in Tables 4 and 5 were determined in accordance with the following test procedures. Where any of these properties is referenced in the appended product claims, it is to be measured in accordance with the specified test procedure.

| Property | Units | Procedure |
|---|---|---|
| Melt Indices, Melt Flow Ratios | dg/min | ASTM D-1238 |
| Density | g/cc | ASTM D-1505 |
| Haze | % | ASTM D-1003 |
| Gloss @ 45° | % | ASTM D-2457 |
| Tensile @ Yield | mPa | ASTM D-882 |
| Elongation @ Yield | % | ASTM D-882 |
| Tensile @ Break | mPa | ASTM D-882 |
| Elongation @ Break | % | ASTM D-882 |
| 1% Secant Modulus | mPa | ASTM D-882 |
| Dart Drop Impact | g/$\mu$m | ASTM D-1709 |
| Elmendorf Tear Resistance | g/$\mu$m | ASTM D-1922 |
| Puncture Force | N/$\mu$m | ASTM D-3763 |
| Puncture Energy | m J/$\mu$m | ASTM D-3763 |
| Reblock | g | ASTMD-3354 |
| Hexane Extractables | wt % | 21CFR177.1520(d) |
| Melt Strength | cN | As Described |
| Molecule Weight | amu | In the Patent |
| Composition Distribution Breadth Index | % | Specification |

Depending on how well the catalyst of the invention incorporates comonomer certain levels of comonomer may yield certain levels of polymer density. For example, highly incorporating catalyst can produce a low density polymer with a low level of comonomer ($C_x$). Similarly, depending on how the catalyst responds to hydrogen, certain levels of melt indices may be obtained. For the preferred alpha-olefin monomer ethylene ($C_2$), depending on the catalyst, the $C_x/C_2$ ratios is preferably less than about 0.2, more preferably less than about 0.1, and as low as about 0.02 to provide a polymer having a density in the range of from about 0.86 g/cm$^3$ to about 0.97 g/cm$^3$, preferably about 0.88 g/cm$^3$ to about 0.94 g/cm$^3$, more preferably between about 0.90 g/cm$^3$ to about 0.935 g/cm$^3$ and most preferably between about 0.91 g/cm$^3$ to about 0.93 g/cm$^3$.

MWD, or polydispersity, is a well known characteristic of polymers. MWD is generally described as the ratio of the weight average molecular weight (Mw) to the number average molecular weight (Mn). The ratio Mw/Mn can be measured directly by gel permeation chromatography techniques, or indirectly, by measuring the ratio of $I_{21}$ to $I_2$ as described in ASTM D-1238-F and ASTM D-1238-E respectively. $I_2$ is well known in the art as equivalent to Melt Index (MI). $I_{21}$ is also known as high load melt index (HLMI). MI is inversely proportional to the molecular weight of the polymer (Mw). The MI of the polymers of the invention are generally in the range of about 0.1 dg/min to about 1000 dg/min, preferably about 0.2 dg/min to about 300 dg/min, more preferably about 0.3 to about 200 dg/min and most preferably about 0.5 dg/min to about 100 dg/min.

The ratio of $I_{21}/I_2$ is known as the melt index ratio (MIR) and for the purposes of this patent specification the ratio is also defined to be melt flow ratio (MFR) MIR is generally proportional to the MWD.

The MIR of the polymers of this invention are generally in the range of greater than 14 to about 200, preferably about 18 to about 60 and most preferably about 22 to about 45.

Those skilled in the art will appreciate that there are several methods for determining MWD of a polymer sample. For the purposes of this patent specification the molecular weight distribution of a polymer can be determined with a Waters Gel Permeation Chromatograph equipped with Ultrastyrogel 3columns and a refractive index detector. In this development, the operating temperature of the instrument was set at 145° C., the eluting solvent was trichlorobenzene, and the calibration standards included sixteen polystyrenes of precisely known molecular weight, ranging from a molecular weight of 500 to a molecular weight of 5.2 million, and a polyethylene standard, NBS 1475.

The polymers of the invention as compared to traditional single metallocene polymers have a broad molecular weight distribution. The MWD of the polymers of the invention are in the range of greater than about 2.5 to about greater than 30, preferably in the range of greater than about 3.0 to about 20 and most preferably in the range of about 4 to about 10. In another embodiment the MWD is greater than about 2.6, 2.7, 2.8, 2.9, 3.0, 3.1, 3.2, 3.3, 3.4, 3.5, 3.6, 3.7, 3.8 and 3.9.

Another important characteristic of the polymer of the invention is its composition distribution (CD). As is well known to those skilled in the art, the composition distribution of a copolymer relates to the uniformity of distribution of comonomer among the molecules of the copolymer. Metallocene catalysts are known to incorporate comonomer very evenly among the polymer molecules they produce. Thus, copolymers produced from a catalyst system having a single metallocene have a very narrow composition distribution—most of the polymer molecules will have roughly the same comonomer content, and within each molecule the comonomer will be randomly distributed. Conventional Ziegler-Natta catalysts, on the other hand generally yield copolymers having a considerably broader composition distribution. Comonomer inclusion will vary widely among the polymer molecules.

A measure of composition distribution is the "Composition Distribution Breadth Index" ("CDBI"). CDBI is defined as the weight percent of the copolymer molecules having a comonomer content within 50% (that is, 25% on each side) of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., *J. Poly. Sci, Poly. Phys. Ed.*, vol. 20, p. 441 (1982) and U.S. Pat. No. 5,008,204, which are incorporated herein by reference.

To determine CDBI, a solubility distribution curve is first generated for the copolymer. This may be accomplished using data acquired from the TREF technique described above. This solubility distribution curve is a plot of the weight fraction of the copolymer that is solubilized as a function of temperature. This is converted to a weight fraction versus composition distribution curve. For the purpose of simplifying the correlation of composition with elution temperature all fractions are assumed to have a Mn greater than or equal to 15,000 g/mole, where Mn is the number average molecular weight fraction. Low weight fractions generally represent a trivial portion of the resin of the present invention. The remainder of this description and the appended claims maintain this convention of the number average molecular weight of the fraction.

From the weight fraction versus composition distribution curve the CDBI is determined by establishing what weight percent of the sample has a comonomer content within 25% each side of the median comonomer content. Further details of determining the CDBI of a copolymer are known to those skilled in the art. See, for example, PCT Patent Application WO 93/03093, published Feb. 18, 1993.

Long chain branching can be determined in the ethylene-butene examples of the invention with C13-NMR. Samples are dissolved in deuterated tetrachloroethane at a concentration of 10–15 wt %. C13-NMR spectra are acquired on a Varian 400 NMR spectrometer at 100 MHz. Acquisition conditions were: 90° pulse angle; 10–20 seconds pulse delay; 2–3 second acquisition time; 8800 Hz sweep width; 125° C. probe temperature; nominally 5000 FIDs; and continuous Quantification was based on the resonance of the two $\alpha\delta+$ carbons and the one nBn methylene carbon, i.e., the three equivalent $\alpha$-methylene carbons of a long chain branch at 34.69 ppm. The nearest neighboring signal, the $\alpha\gamma$ resonance of a BEB sequence at 34.71, is sufficiently small and well resolved from the LCB $\alpha$-methylene signal with these materials that it does not interfere.

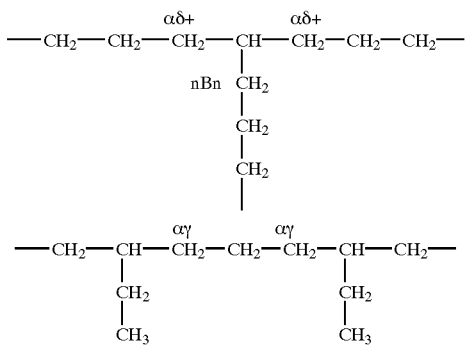

The assignment at 34.69 was confirmed by adding known amounts of Dowlex 2045 between 0.1 and 1.0 wt % to a number of the butene examples of the invention. Dowlex 2045 is an ethylene-octene copolymer which contains no long- chain branching, but does contain hexyl branches, the $\alpha$-methylenes of which are indistinguishable from the a-methylenes of a long-chain branch. In each experiment, the magnitude of the signal at 34.69 corresponded to the amount of Dowlex added.

The polymers of the present invention have CDBI's generally in the range of greater than 50% to 99%, preferably in the range of 55% to 85%, and more preferably 60% to 80%, even more preferably greater than 60%, still even more preferably greater than 65%. Obviously, higher or lower CDBI's may be obtained using other catalyst systems with changes in the operating conditions of the process employed.

This polymers of this invention are distinguishable over LDPE, in that, for the purposes of this patent specification the polymers of the invention are substantially linear and not formed by a free radical polymerization process. The polymers of the invention are also distinguishable from known LLDPE polymers on the basis of their molecular weight distribution (MWD). The MWD of the present polymers is materially broader than that of LLDPE's produced using the same metallocene in an unsupported form in a solution or slurry polymerization process. The polydispersity index ($M_w/M_n$) of our polymers is typically in the range of 2.6–10, compared to a range of 2–3.5, typical for known metallocene LLDPE polymers. In this regard the present polymers are similar to many commercially available LLDPE polymers produced using conventional Ziegler-Natta catalysts. However, the tails of the molecular weight distribution curve for the present polymer are considerably smaller than those of known conventional Ziegler-Natta LLDPE's. This distinction is readily apparent by comparing the ratio of $M_z/M_w$ (the ratio of the third moment to the second moment) and $M_z+1/M_w$ (ratio of the fourth moment to the second moment). Utilizing the present invention, LLDPE polymers can be produced with an $M_z/M_w$ less than 3.0, usually less than 2.5 and most typically in the range of 2–2.5. In contrast, the ratio of $M_z/M_w$ for conventional Ziegler-Natta polymers is typically above 2.5. Table 4 provides further data regarding $M_z$ and $M_w$ for our polymers.

The polymers of this invention unexpectedly exhibit surprising melt strength properties, see Table 4. The melt strength of a polymer at a particular temperature, e.g., 190° C., can be determined with a Gottfert Rheotens Melt Strength Apparatus. The measurement is done by grasping the extrudate from a capillary rheometer, or from an extruder equipped with a capillary die, using variable speed gears (see FIG. 1 below) and increasing the gear speed at a constant acceleration until the molten polymer strand breaks. The force in the strand is measured with a balance beam in conjunction with a linear variable displacement transducer. The force required to extend and then break the extrudate is defined as the melt strength.

The force is measured in centinewtons (cN). A typical plot of force vs. wheel velocity appears in the following figure. Linear polymers frequently resonate immediately before the strand breaks. In such cases, the plateau force is approximated by the midline between the oscillations.

The most distinctive attribute of examples 66 through 75 is their unexpectedly high melt strength. Melt strength is a key property of products used in blown film, thermoforming, and blow molding processes. In a blown film process, high melt strength is required to maintain a stable bubble when running at high temperatures and/or at high production rates, especially on large lines. If the melt strength is unacceptably low, holes form in a molten web, which causes the bubble to collapse and occasionally tear off. This, in turn, results in loss of production, and can lead to subsequent quality problems if the material in the extruder begins to degrade during the down-time. Low melt strength in linear polyethylenes precludes the film manufacturer from taking advantage of the excellent draw-down characteristics inherent with most linear polyethylenes unless a melt strength enhancer, such as LDPE, is added.

A number of the examples of the invention were extruded into blown film on a 2½" (6.35 cm) Egan blown film line equipped with a 6" (15.2 cm) diameter die, a variety of die gaps, and a single, dual-lip air ring. The following table illustrates the superior bubble stability of the invention at commercial extrusion rates vs. a 1 MI comparative example. Superiority is defined as being able to produce thinner gauges at equal or faster rates without loss of bubble stability.

| Extrusion Perfomance | Comparative Example | Example | | | |
|---|---|---|---|---|---|
| | 38 | 67 | 70 | 72 | 75 |
| die gap mils (μ) | 60 | 60 | 30 | 60 | 30 |
| | (1524) | (1524) | (762) | (1524) | (762) |
| film gauge mils (μ) | 1.5 | 1.0 | 1.0 | 0.7 | 0.5 |
| | (38) | (25.4) | (25.4) | (17.8) | (12.7) |
| rpm | 90 | 110 | 110 | 90 | 110 |
| melt temp F. | 417 | 403 | 394 | 396 | 404 |
| (° C.) | (214) | (206) | (201) | (202) | (207) |
| Rate lb/hr (kg/hr) | 196 | 212 | 210 | 198 | — |
| | (89) | (96) | (95) | (90) | |
| ESO (1) | 7.96 | 6.46 | 7.03 | 8.62 | — |
| RLS (2) | BS | ND | ND | ND | LS |

(1) Energy specific output (lb/HP-hr)
(2) Rate limiting step (BS = bubble stability, LS = line speed, ND = not observed)

Examples 72 of the invention was evaluated with a Dolci blown film line equipped with 6 cm diameter screw, 20 cm diameter die, a 1 mm die gap, and a single, dual-lip air ring. Example 72 was extruded at 1.22 kg/hr/cm (6.83 lb/hr/in) and 190° C. melt temperature, and drawn down to 6 microns (0.23 mils) without loss of bubble.

In thermoforming processes, poor melt strength results in poor control over part thickness and thickness uniformity. In blow molding processes, poor melt strength results in excessive parison sagging and poor control over thickness and thickness uniformity.

The following figure is a graphical illustration of the melt strength of numerous examples of the invention compared to a variety of commercially available and experimental polyethylenes. The grouping labeled "Ziegler-Natta" includes both gas phase and solution products. The grouping labeled "Standard Metallocene" includes single component products made in either gas phase or high pressure, plus numerous blends of these products.

The boundaries in this figure are defined as follows:

$$\text{Low boundary: Force} = 2 + \frac{10}{e^{MI}}$$

$$\text{High boundary: Force} = 2 + \frac{15}{e^{MI}}$$

Where MI is the melt index and e is the mathematical constant as described in the Handbook of Chemistry and Physics (70th Edition) CRC Press (1989–1990), page A-1. e for the purposes of this patent specification and appended claims is the value 2.71828.

The low boundary describes the apparent maximum melt strength for titanium-based Ziegler-Natta products and the standard metallocene products, and separates LDPEs and the invention from these two reference populations. The high boundary separates LDPEs and the invention from all the comparative samples, including chromium catalyzed broad MWD products and bimodal series reactor products.

The melt strength advantage of chromium-catalyzed products and series slurry reactor products over Ziegler-Natta products and products made with metallocenes such as those described in examples 66–80 is attributed primarily to the presence of a high molecular weight component in these products. In the case of the chromium-based catalysts, their enhanced melt strength may also reflect cross-linked or long-chain branched material created while these highly unsaturated materials were being pelletizing. The high melt strength of LDPEs is attributed to their long-chain branches which typically exceed 5 LCBs/1000 carbons.

At equivalent molecular weights, the melt strength of polymers made with the inventive catalyst is equivalent to the melt strength of LDPE's (and LD/LL blends), and is typically 2–3 times higher than that of polymers made with conventional Ziegler-Natta titanium-based catalysts or with other metallocene catalysts capable of producing narrow MWD's.

Typically the polymers of the invention have a melt strength in the range of about 3.0 centi-newton (cN) to about 20 cN, preferably greater than about 3.5 cN and most preferably. greater than about 5.0 cN, even more preferably greater than 6 cN and still more preferably greater than 7 cN. The melt strength of the polymers of the invention are more than twice that of typical metallocene or conventional Ziegler-Natta made polymers. Typically the polymers of the present invention have melt strengths in the range of 2× to 4× that of typical metallocenes and conventional Ziegler-Natta produced polymers, the polymers of the invention are preferably greater than 2× and most preferably greater than 2.5×.

Another important component of processability is pumpability, i.e., how easily does the melt flow through extrusion equipment at given temperature and motor load.

The energy required to cause melt to flow through the extrusion equipment is measured in horsepower. Horsepower is proportional to kilowatts which is proportional to voltage times amperage drawn. Motor volts depends on screw rpm's; motor amps is a function of the polymer, melt temperature, melt index and extrusion rate.

Figure 4:
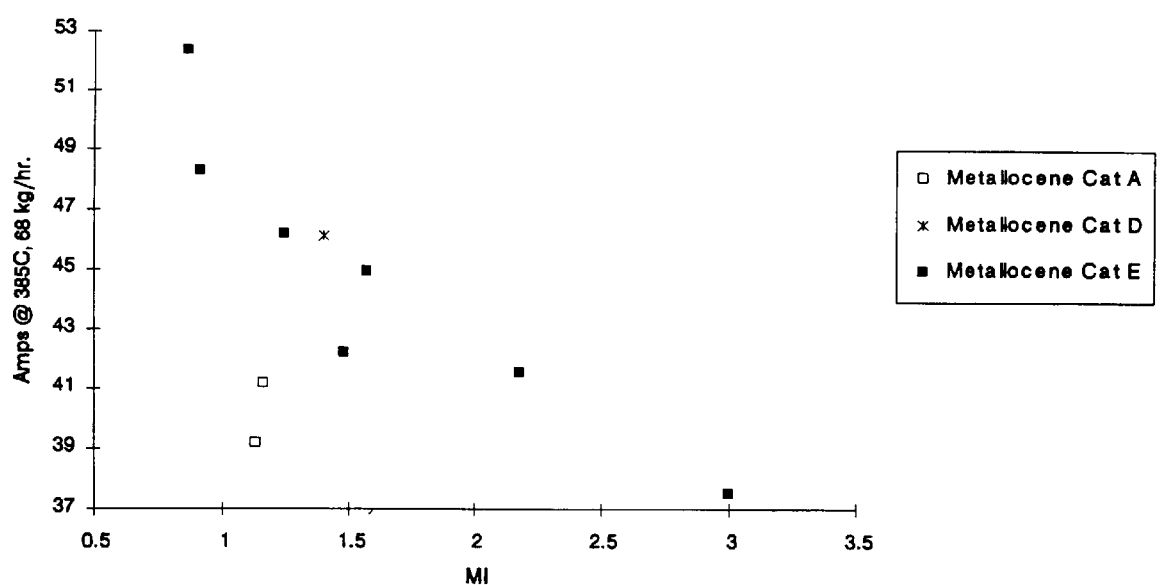
FIG. 4 is a graph of extruder amps as a function of melt index.
Figure 5:
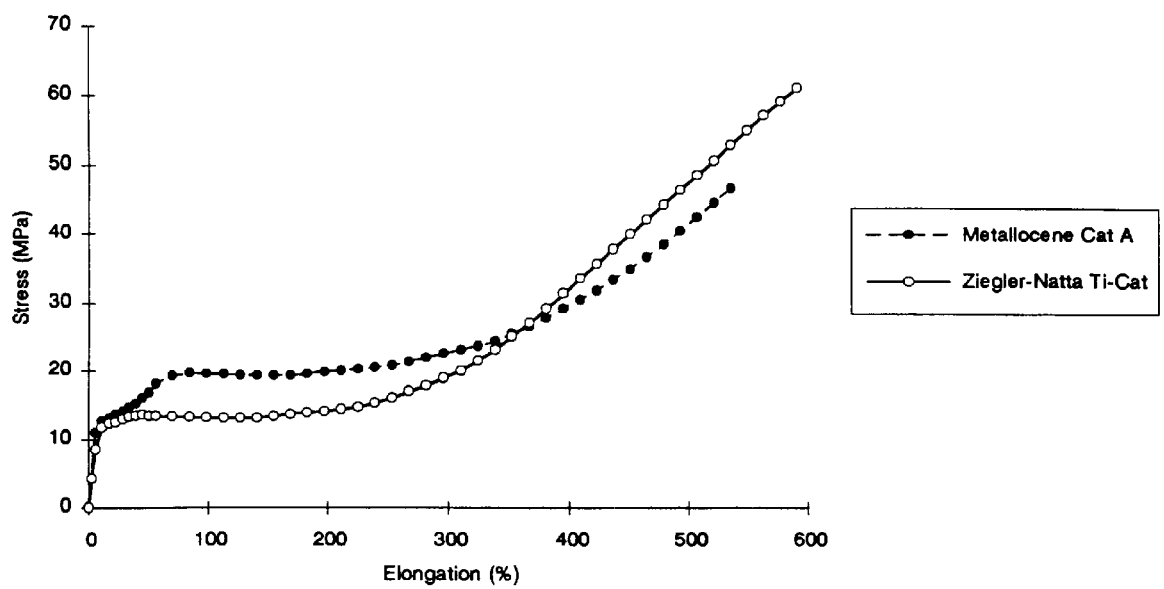
FIG. 5 is a graph of film stress as a function of elongation.
Figure 6:
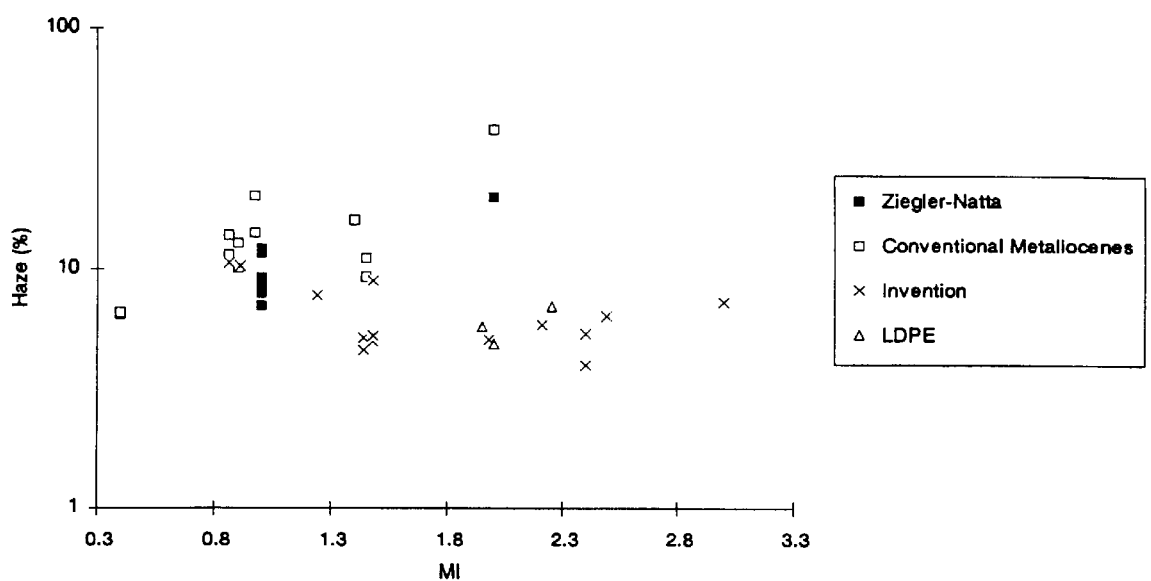
FIG. 6 is a graph of blown film haze as a function of MI.

In FIG. 4, all samples were extruded at common screw rotation rate, which implies the same power voltage. Therefore, the amperage drawn is directly proportional to the extruder power consumption. The observed amps is plotted vs. MI. Clearly, the broader products made with $(1,2/1,3\text{-MeEtCp})_2\text{ZrCl}_2$ (metallocene A) of the invention require less power than products made with $(''\text{BuCp})_2\text{ZrCl}_2$ (metallocene D) or mixtures of metallocene A with either $(''\text{PrCp})_2\text{ZrCl}_2$ or with $(1\text{-Me-3-}''\text{BuZr})\text{ZrCl}_2$. These mixed metallocenes are collectively referred to as metallocene E. At equivalent MI, the narrow products made with Metallocene Catalyst E require the same horsepower as the traditional, low melt strength copolymer made with Metallocene Catalyst D. However, since the Catalyst E products have high melt strength, higher MI products can now be used since they will have adequate bubble stability. If one were to compare products with equal, melt strengths made with Catalyst E and one of the catalysts of the lower melt strength control group, the Catalyst E products would require considerably less horsepower. For example, a 2 MI Catalyst E product has about the same melt strength as a 0.8 MI Catalyst D product. The E product requires about 42 amps, as compared to the D product which requires more than 50 amps.

Film Properties

One of the processing disadvantages of LDPE's is their inability to be drawn down into thin gauges, e.g., less than 25.4μ (1 mil). Copolymers produced with metallocenes A and E, on the other hand, have substantially greater drawdown, as do typical linear polyethylenes. Gauges less than 12.7; μ (0.5 mil) are easily achievable.

The films of this invention can be formed from the polymer of the invention by methods well known in the art. For example, forming operations include, film, sheet, and other fiber extrusion and co-extrusion as well as blow molding, injection molding and roto molding. Films include blown or cast films in monolayer or multilayer constructions formed by coextrusion or by lamination. The preferred forming operation for the film of the invention is a blown film operation.

For example, the polymers of the invention may be extruded in a molten state through a flat die and then cooled to form sheets or cast films. Alternatively, the polymers may be extruded in a molten state through an annular die and then blown and cooled to form a tubular film. The tubular film may be axially slit and unfolded to form a flat film. The films of the invention may be unoriented, uniaxially oriented or biaxially oriented.

The films of the invention may be single layer or multi-layer films. The multiple-layer films may consist of one or more layers formed from polymers of the invention. The films may also have one or more additional layers formed from other materials such as other polymers, LLDPE, LDPE, HDPE, PP, PB, EVA, polyester, EVOH and, for instance, metal foils, paper and the like.

Multiple-layer films may be formed by methods well known in the art. If all layers are polymers, the polymers may be coextruded through a coextrusion feedblock and die assembly to yield a film with two or more layers adhered together but differing in composition. Multiple-layer films may also be formed by extrusion coating whereby a substrate material is contacted with the hot molten polymer as the polymer exits the die. Extrusion coating is useful with substrates that are woven or knitted from natural or synthetic fibers or yarns, e.g., textiles, or substrates made from non-polymer materials such as glass, ceramic, paper or metal.

Multiple-layer films may also be formed by combining two or more single layer films prepared as described above. The two layers of a film so formed may be adhered together with an adhesive or by the application of heat and pressure.

The films of the invention are useful as shrink films, cling film, stretch film, sealing films, oriented films, snack packaging, heavy duty bags, grocery sacks, baked and frozen food packaging, medical packaging, industrial liners, membranes, etc. in food-contact and non-food contact application. Fiber forming operations include melt spinning, solution spinning and melt blown fiber operations. Such fibers may be used in woven or non-woven form to make filters, diaper fabrics, medical garments, geotextiles, etc. General extruded articles include medical tubing, wire and cable coatings, geomembranes, and pond liners. Molded articles include single and multi-layered constructions in the form of bottles, tanks, large hollow articles, rigid food containers, toys and the like.

The films of the invention can contain anti-oxidants, slip, anti-block, processing aids, pigments, UV inhibitors, anti-static agents, or other additives as required for the application with out substantially departing from the scope of our invention.

The polymers of the invention can also be employed in multi-layer films. In some applications they will be desirable as the skin layer in coextruded films to impart enhanced clarity, blocking resistance and cling performance to the final film. In other applications they will be used as the core layer, taking advantage of their toughness and puncture resistance.

While film is likely the single most important application for polymers of the invention, they have other uses. The polymers of the invention are useful in producing plastic sheeting, injection molding, rotomolding and other processes.

The polymer of the invention can be blended with additives and other ingredients known to those of ordinary skill in the art such as fillers, antioxidants, tackifiers, UV stabilizers, heat stabilizers, pigments, dyes, waxes, silica, talc and the like. It is also possible to add peroxides and other free radical generators to the inventive polymers in order to modify their rheological properties.

In addition, the polymers of the present invention can be modified by blending with other polymers. It is well known in the prior art to add various other polymers to LLDPE in order to obtain improved performance. For example, polymers can be added to improve the processing characteristics of the LLDPE and/or the properties of films made from the polymers. Such film properties may include stiffness, cling, clarity, gloss, adhesion to substrates, cutting characteristics, sealing characteristics, coefficient of friction, tensile strength, MD and TD tear strength, impact strength, puncture resistance, blocking tendency, surface characteristics, shrinkage characteristics, low temperature flexibility, gas and moisture permeability, other properties. Generally the property improvements represent increases in the level of the particular film property, but sometimes blending is done to achieve lower property levels, such as, for example, lower tear resistance in order to impart good openability to packages made from the films.

Polymers suitable for blending with the inventive polymers of the invention include, but are not limited to, polyolefins such as polypropylene and ethylene propylene copolymers, VLDPE, plastomers, LDPE, EVA, EMA, copolymers of acrylic acid, polymethylmethacrylate or any other polymers polymerizable by a high-pressure free radical process, PVC, polybutene-1, isotactic polybutene, ABS resins, elastomers such as ethylene-propylene rubber (EPR), vulcanized EPR, EPDM, block copolymer elastomers such as SBS and the like, nylons, polycarbonates, PET resins, crosslinked polyethylene, copolymers of ethylene and vinyl alcohol (EVOH), polymers of aromatic monomers such as polystyrene, poly-1 esters, high molecular weight HDPE, low molecular weight HDPE, graft copolymers generally, polyacrylonitrile homopolymer or copolymers, thermoplastic polyamides, polyacetal, polyvinylidine fluoride and other fluorinated elastomers, polyethylene glycols, polyisobutylene (PIB), hydrocarbon resins, terpene resins, and other tackifying polymers, and numerous others and combinations thereof.

Polymer properties are set forth in Table 4; blown film properties are set forth in Table 5.

Examples 34–65 are comparative examples and examples 66–80 are examples of polymers of this invention.

Three distinctive features of films made with the subject copolymers relative to conventional Ziegler-Natta copolymers are their low extractables (and associated low reblock), their good clarity, and their unusual tensile properties at low elongation.

The low extractables from films made with these products is especially dramatic when compared to the extractables from hexene copolymer films made with conventional Ziegler-Natta catalysts at higher MI's (e.g., control #2). The broader MWD polymers of the invention made with metallocene A have a substantially lower extractable level than the conventional Ziegler-Natta made products. The preferred range of extractables for the film of the invention are in the range of 0.5% to 2.0%, preferably 0.5 to 1.6% and most preferably 0.5 to 1.4%.

Another advantage of blown films made with the invention is their high tensile stress at low elongation. The following figure illustrates the stress-strain profile for LL-3001 (Example 38) and Example 68 (metallocene catalyst A). Note that at elongations between about 50 and 300%, films made with the invention have about 50% higher stress compared to the reference. This higher stress could be useful in stretch wrap where it would translate to greater force-to-load, and in T-shirt bags where it would produce tougher handles which would support greater loads before substantial elongation.

Another application where high tensile stress at low elongation could be useful is in handwrap stretch film see Table 6. Handwrap stretch films are frequently produced such that they have a higher yield strength and higher tensile values at 50, 100 and 200% elongation than the normal high stretch machine type films. These films are frequently called "stiffer" due to the higher stretching force. This film stiffness is required to allow manual application of the film to the product load. During this manual wrapping, the film is normally stretched less than 100% and frequently stretch less than 50%. A "stiff" low stretch film allows the most rapid and reliable handwrap usage while maintaining adequate holding force on the wrapped load.

Another property of blown films made with the invention is their excellent clarity at higher MIs. The following figure illustrates the haze vs. MI for blown films produced with the 2½" (6.35 cm) Egan blown film line equipped with a single, dual-lip air ring. Note that haze generally increases as MI increases for films made with Ziegler-Natta products and conventional metallocenes. However, the haze of blown films produced with the invention do not. The absolute film haze with the invention above 1.5 MI is as good as that of high clarity LDPEs.

The principal advantages of linear polyethylenes over LDPEs includes significantly greater drawability, higher modulus at equivalent density, higher tensile strength at equivalent MI, higher puncture resistance, greater elongation, and higher ESCR at equivalent MI and density. Linear polyethylenes made with higher alpha-olefin comonomers have much higher impact resistance and tear resistance. The invention combines the high melt strength and good clarity of LDPEs with the superior mechanical properties of Ziegler-Natta linear polyethylenes.

Tensile force at low elongation can be increased by increasing density. However, being able to maintain a low density, as is possible with the copolymers of this invention, allows film manufactures to protect other film properties sensitive to increases in density such as impact and tear resistance.

Products representing the invention are easily distinguished from commercial copolymers made in a solution process with a metallocene catalyst by comparing the power required to extrude each. The following table summarizes the extrusion performance of the polymers of the invention and two comparative Example 46 and 47 products. The equipment used to generate this data includes a 2½" (6.35 cm) Egan blown film line equipped with a 40 HP D.C. motor, a Sterlex LLDPE Barrier screw with a Maddor mixer and a 60 mil (1524μ) die gap.

| Example | rpm | melt temperature °F. (° C.) | output lb/hr (kg/hr) | Mw | Amps |
| --- | --- | --- | --- | --- | --- |
| C46 | 50 | 392 (200) | 135 (61.2) | 77330 | 44.4 |
| C47 | 50 | 391 (199) | 136.4 (61.8) | 76800 | 43.1 |
| 66 | 70 | 393 (200) | 143 (64.8) | 101500 | 51.0 |
| 67 | 70 | 389 (198) | 145 (65.7) | 98600 | 47.5 |
| 71 | 70 | 384 (196) | 144 (65.3) | 89100 | 44.5 |
| 71 | 70 | 405 (207) | 143 (64.8) | 89100 | 41.5 |
| 74 | 70 | 372 (189) | 153 (69.4) | 75800 | 39.0 |
| 75 | 70 | 404 (207) | 142.6 (64.6) | 93200 | 44.5 |

Figure 7:
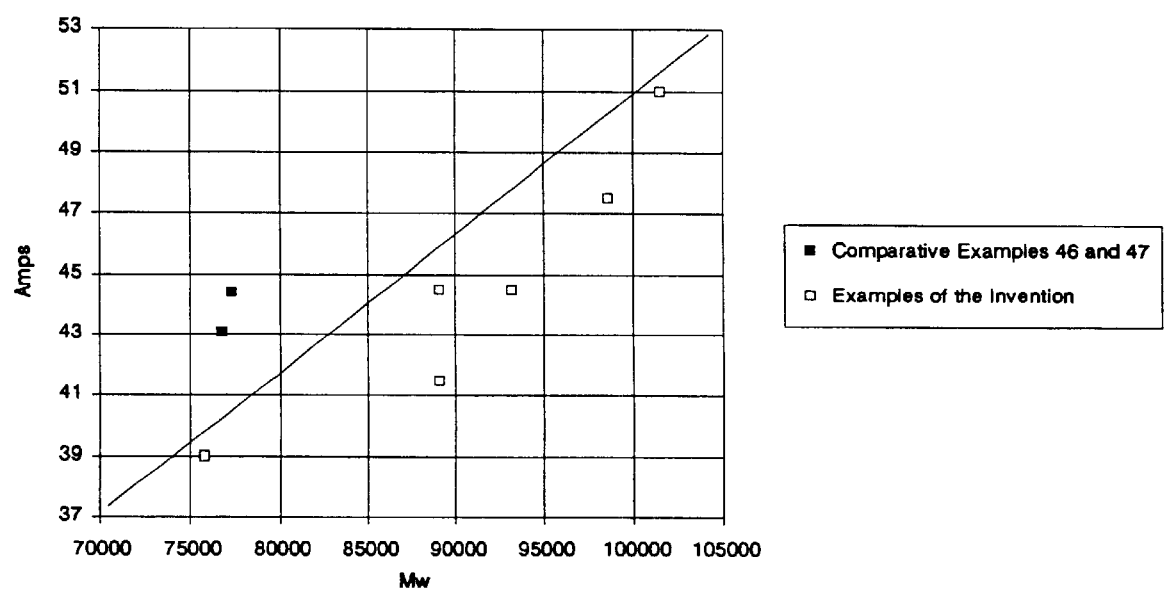
FIG. 7 is a graph of the extruder amps as a function of Mw, weight average molecular weight.

FIG. 7 illustrates the extrusion amps of the polymers of the invention relative to two comparative examples. It is well known that extrusion amps increase as molecular weight and output increase, and as melt temperature decease. Note that at approximately the same Mw as comparative examples 46 and 47, that the inventive polymer of example 74 was extruded at a colder temperature and higher output, but still required 4–5 fewer amps. If example 74 of the invention had been extruded at the same output and temperature as those of comparative examples 46 and 47, it is predicted that it would have required about 8 fewer amps.

EXAMPLES

In order to provide a better understanding of the invention including representative advantages thereof, the following examples are offered.

Examples 1–9 and 15–26 illustrate embodiments of this invention. Examples 10–14 are comparative. The designation of $(1,2/1,3\text{-MeEtCp})_2\text{ZrCl}_2$ is illustrative of the catalyst of the invention as previously described in this patent specification.

EXAMPLE 1

Preparation of in-situ Mixture of Isomers of $(\text{MeEtCp})_2\text{ZrCl}_2$

Methylcyclopentadiene dimer was cracked to the monomeric units over high viscosity silicone oil. A sample of the freshly prepared methylcyclopentadiene (100.5 g, 1.26 mol) was diluted in 500 cm$^3$ tetrahydrofuran in a 3-liter flask. The flask was cooled in ice-bath to 0° C. and 900 cm$^3$ of 1.4 M solution of methyl-lithium in hexanes was added slowly. After complete addition of the MeLi, the ice-bath was removed and stirring continued for 3 hours at room temperature. Then the flask was cooled again to 0° C. and bromoethane (139.2 g, 1.28 mol) was added slowly as solution in THF. The mixture was then stirred for 15 hours. The resulting product was washed with distilled water and the organic layer was dried over sodium sulfate. This was then filtered and concentrated under vacuum and the concentrate was distilled with a gentle $N_2$ sparge; the fraction boiling between 118–120° C. was saved.

Freshly distilled methylethyl-cyclopentadiene isomers (41.9 g, 0.388 mol) as above was dissolved in 30 cm$^3$ THF. 242 cm$^3$ of 1.6 M solution of nBuLi in hexanes was slowly added to this and stirring continued for 3 hours after all the nBuLi had been added. This solution was then added slowly to a slurry of $ZrCl_4$ (45.2 g, 0.194 mol) in 200 cm$^3$ THF at −80° C. Stirring continued for 15 hours as the temperature slowly warmed up to 20° C. The solvent was removed under vacuum and the solid recovered was extracted with toluene. The toluene extract was concentrated and pentane was added to aid precipitation of the pure compound at −30° C.

Preparation of Supported $(\text{MeEtCp})_2\text{ZrCl}_2$ Isomers 20 g of Davison 948 silica dried to 200° C. was slurried in 150 cm$^3$ toluene in a reaction flask. The flask was cooled to 0° C. and 35 cm$^3$ of 30 wt % methylalumoxane in toluene was added. After 0.5 hours, the temperature was raised to 70° C. and maintained for 3 hours. Then a toluene solution of 0.428 g $(\text{MeEtCp})_2\text{ZrCl}_2$ isomers as prepared above was added slowly followed by a 2 hours hold of the reaction conditions. Then the resultant catalyst was dried to free-flowing powder under reduced pressure. This catalyst had Al/Zr molar ratio of 140 and Zr loading of 0.35 wt %.

Polymerization Test

The silica supported catalyst as prepared above was tested for ethylene/1-butene copolymerization in a semi-batch gas-phase reactor at 85° C. The pressure in the reactor was held constant by continuously feeding 5 mol-% 1-butene in ethylene to compensate for any pressure change due to polymerization. After 0.5 hours, the polymer formed was separated from the seed bed material and analyzed for resin molecular properties shown in Table 1.

EXAMPLE 2

Preparation of Supported (MeEtCp)$_2$ZrCl$_2$ Isomers for Olefin Polymerization 10 g of Davison 948 silica dried to 200° C. was slurried in 150 cm$^3$ toluene in a reaction flask. The flask was cooled to 0° C. and 35 cm$^3$ of 30 wt % methylalumoxane in toluene was added. After 0.5 hours, the temperature was raised to 70° C. and maintained for 3 hours. Then a toluene solution of 0.478 g (MeEtCp)$_2$ZrCl$_2$ isomers as prepared above was added slowly followed by a 1 hour hold of the reaction conditions. Then the resultant catalyst was dried to free-flowing powder under reduced pressure. This catalyst had Al/Zr molar ratio of 120 and Zr loading of 0.60 wt %. This catalyst was then tested for ethylene/1-butene copolymerization as described in Example 1; the results are summarized in Table 1.

EXAMPLE 3

Preparation of Supported (MeEtCp)$_2$ZrCl$_2$ Isomers for Olefin Polymerization 20 g of Davison 948 silica dried to 200° C. was slurried in 120 cm$^3$ toluene in a reaction flask. The flask was cooled to 0° C. and 65 cm$^3$ of 30 wt % methylalumoxane in toluene was added. After 0.5 hours, the temperature was raised to 80° C. and maintained for 5 hours. Then a toluene solution of 0.966 g (MeEtCp)$_2$ZrCl$_2$ isomers as prepared above was added slowly followed by a 1 hour hold of the reaction conditions. Then the resultant catalyst was dried to free-flowing powder under reduced pressure. This catalyst had Al/Zr molar ratio of 120 and Zr loading of 0.60 wt %. This catalyst was then tested for ethylene/1-butene copolymerization as described in Example 1; the results are summarized in Table 1.

EXAMPLE 4

Preparation of Supported (MeEtCp)$_2$ZrCl$_2$ Isomers for Olefin Polymerization 650 g of Davison 948 silica dried to 200° C. was slurried in 2500 cm$^3$ toluene in a reaction flask. The flask was cooled to 0° C. and 1440 cm$^3$ of 30 wt % methylalumoxane in,toluene was added. After 3.5 hours, the temperature was raised to 70° C. and maintained for 3 hours. Then a toluene solution of 25.5 g (MeEtCp)$_2$ZrCl$_2$ isomers as prepared above was added slowly followed by a 2 hours hold of the reaction conditions. Then the resultant catalyst was dried to free-flowing powder under reduced pressure. This catalyst had Al/Zr molar ratio of 100 and Zr loading of 0.60 wt %. This catalyst was then tested for ethylene/1-butene copolymerization as described in Example 1; the results are summarized in Table 1.

EXAMPLE 5

Preparation of Supported (MeEtCp)$_2$ZrCl$_2$ Isomers for Olefin Polymerization 400 g of Davison 948 silica dried to 200° C. was slurried in 1500 cm$^3$ toluene in a reaction flask. The flask was cooled to 0° C. and 800 cm$^3$ of 30 wt % methylalumoxane in toluene was added. After 2 hours, the temperature was raised to 70° C. and maintained for 3 hours. Then a toluene solution of 15.6 g (MeEtCp)$_2$ZrCl$_2$ isomers as prepared above was added slowly followed by a 2 hours hold of the reaction conditions. Then the resultant catalyst was dried to free-flowing powder under reduced pressure. This catalyst had Al/Zr molar ratio of 90 and Zr loading of 0.60 wt %. This catalyst was then tested for ethylene/1-butene copolymerization as described in Example 1; the results are summarized in Table 1.

EXAMPLE 6

Preparation of Supported (MeEtCp)$_2$ZrCl$_2$ Isomers for Olefin Polymerization 10 g of Davison 948 silica dried to 200° C. was slurried in 150 cm$^3$ heptane in a reaction flask. The flask was cooled to 0° C. and 28 cm$^3$ of 30 wt % methylalumoxane in toluene was added. After 0.5 hours, the temperature was raised to 70° C. and maintained for 3 hours. Then a toluene solution of 0.42 g (MeEtCp)$_2$ZrCl$_2$ isomers as prepared above was added slowly followed by a 1 hour hold of the reaction conditions. Then the resultant catalyst was dried to free-flowing powder under reduced pressure. This catalyst had Al/Zr molar ratio of 100 and Zr loading of 0.60 wt %. This catalyst was then tested for ethylene/1-butene copolymerization as described in Example 1; the results are summarized in Table 1.

EXAMPLE 7

Preparation of in-situ Mixture of Isomers of (Me$_n$PrCp)$_2$ZrCl$_2$

The procedure described in Example 1 was adopted except that after the freshly-prepared methylcyclopentadiene was lithiated, 1-bromopropane was used and the subsequent work and conditions were the same.

Preparation of Supported Isomers (Me$''$PrCp)$_2$ZrCl$_2$ 28 g of Davison 948 silica dried to 200°C. was slurried in 300 cm$^3$ heptane in a reaction flask. The flask was cooled to 0° C. and 75 cm$^3$ of 30 wt % methylalumoxane in toluene was added. After 0.5 hours, the temperature was raised to 70° C. and maintained for 3 hours. Then a toluene solution of 1.2 g (Me$''$PrCp)$_2$ZrCl$_2$ isomers as prepared above was added slowly followed by a 2 hours hold of the reaction conditions. Then the resultant catalyst was dried to free-flowing powder, under reduced pressure. This catalyst had Al/Zr molar ratio of 120 and Zr loading of 0.55 wt %. This catalyst was then tested for 1 hour for ethylene/1-butene copolymerization as described in Example 1; the results are summarized in Table 1.

EXAMPLE 8

Preparation of in-situ Mixture of Isomers of (Me$_n$BuCp)$_2$ZrCl$_2$

The procedure described in Example 1 was adopted except that after the freshly-prepared methylcyclopentadiene was lithiated, 1-bromobutane was used and the subsequent work and conditions were the same.

Preparation of Supported Isomers (Me$_n$BuCp)$_2$ZrCl$_2$ 20 g of Davison 948 silica dried to 200° C. was slurried in 250 cm$^3$ heptane in a reaction flask. The flask was cooled to 0° C. and 42 cm³ of 30 wt % methylalumoxane in toluene was added. After 0.5 hours, the temperature was raised to 70° C. and maintained for 3 hours. Then a toluene solution of 0.671 g (Me"BuCp)₂ZrCl₂ isomers as prepared above was added slowly followed by a 2 hours hold of the reaction conditions. Then the resultant catalyst was dried to free-flowing powder under reduced pressure. This catalyst had Al/Zr molar ratio of 120 and Zr loading of 0.45 wt %. This catalyst was then tested for 1 hour for ethylene/1-butene copolymerization as described in Example 1; the results are summarized in Table 1.

EXAMPLE 9

Preparation of in-situ Mixture of Isomers of (Me$^i$BuCp)₂ZrCl₂

1-Bromo-2-methylpropane (276 g, 2.01 mol) was sampled into a 2-liter flask and cooled to 0° C. 1000 cm³ of a 2.0 M solution of sodium cyclopentadienide in THF was added slowly and then stirring was continued for 15 hours. The product was extracted from the sodium by-product and distilled under N₂ at 120° C.

The freshly distilled $^i$BuCp (108 g, 0.885 mol) from above was weighed into a 1-liter flask and 400 cm³ THF was added. The flask was cooled to 0°C. and 356 cm³ of 2.5 M solution of n-BuLi in hexanes was added slowly. Stirring was continued for 2 more hours after all the n-BuLi had been added. Then the flask was cooled to −78° C. and 125.8 g of methyl iodide in 75 cm³ THF was added slowly. The reaction was allowed to stir for 15 hours. Then the Me$^i$BuCp product was extracted from the LiI by-product and distilled under N₂.

A sample of the freshly distilled Me$^i$BuCp (78.4 g, 0.576 mol) from above was weighed into a 1-liter reaction flask and the flask was cooled to 0° C. 360 cm³ of a 1.6 M solution of n-BuLi in hexanes was added slowly. After 3 hours, the resulting solution was added slowly to a suspension of ZrCl₄ (67.14 g, 0.288 mol) in THF at −78° C. The reaction slowly warmed up to room temperature for 15 hours. The solvent was removed and the crude product was extracted with toluene/pentane.

Preparation of Supported (Me$^i$BuCp)₂ZrCl₂ Isomers 20 g of Davison 948 silica dried to 200° C. was slurried in 200 cm³ toluene in a reaction flask. The flask was cooled to 0° C. and 65 cm³ of 30 wt % methylalumoxane in toluene was added. After 0.5 hours, the temperature was raised to 70° C. and maintained for 3 hours. Then a toluene solution of 1.11 g (Me$^i$BuCp)₂ZrCl₂ isomers as prepared above was added slowly followed by a 2 hours hold of the reaction conditions. Then the resultant catalyst was dried to free-flowing powder under reduced pressure. This catalyst had Al/Zr molar ratio of 120 and Zr loading of 0.60 wt %. This catalyst was then tested for ethylene/1-butene copolymerization as described in Example 1; the results are summarized in Table 1.

EXAMPLE 10

Preparation of (1,3-MeEtCp)₂ZrCl₂

1,3-Methylethylcyclopentadiene (12.5 g, 0.116 mol) was weighed into a reaction flask and 60 cm³ THF was added. The flask was cooled to 0° C. and 73 cm³ of a 1.6 M solution of n-BuLi in hexane was added slowly. The reaction was allowed to continue for an additional 3 hours after all the n-BuLi had been added. The resulting solution was then added slowly to a suspension of ZrCl₄ (13.52 g, 0.058 mol) in THF at −78° C. The reaction slowly warmed up to room temperature for 15 hours. The solvent was removed and the crude product was extracted with toluene/pentane.

Preparation of Supported (1,3-MeEtCp)₂ZrCl₂

52.3 g of Davison 948 silica dried to 200° C. was slurried in 300 cm³ heptane in a reaction flask. The flask was cooled to 0° C. and 105 cm³ of 30 wt % methylalumoxane in toluene was added. After 0.5 hours, the temperature was raised to 70° C. and maintained for 3 hours. Then a toluene solution of 1.521 g (1,3-MeEtCp)₂ZrCl₂ as prepared above was added slowly followed by a 1 hour hold of the reaction conditions. Then the resultant catalyst was dried to free-flowing powder under reduced pressure. This catalyst had Al/Zr molar ratio of 120 and Zr loading of 0.45 wt %. This catalyst was then tested for 1 hour for ethylene1-butene copolymerization as described in Example 1; the results are summarized in Table 1.

EXAMPLE 11

Preparation of Supported ("PrCp)₂ZrCl₂

1200 cm³ of a 30 wt % MAO solution in toluene was added to 680 g of Davison 948 silica dried to 200° C. in a 2-gal reactor. Then 2000 cm³ toluene was added. The temperature was raised to 700° C. and maintained for 4 hours. Then a toluene solution of 16.5 g ("PrCp)₂ZrCl₂ was added slowly followed by a 2 hours hold of the reaction conditions. The resultant catalyst was dried to free-flowing powder under reduced pressure. This catalyst had Al/Zr molar ratio of 130 and Zr loading of 0.4 wt %. A sample of this catalyst was tested for ethylene/1-butene copolymerization as described in Example 1; the results are summarized in Table 1.

EXAMPLE 12

Preparation of Supported (1,3-Me"BuCp)₂ZrCl₂

20.6 g of Davison 948 silica dried to 200° C. was slurried in 110 cm³ toluene in a reaction flask. The flask was cooled to 0° C. and 36.5 cm³ of 30 wt % methylalumoxane in toluene was added. After 1 hour, the temperature was raised to 70° C. and maintained for 4 hours. Then a toluene solution of 0.742 g (1,3-Me"BuCp)₂ZrCl₂ as prepared above was added slowly followed by a 2 hours hold of the reaction conditions. Then the resultant catalyst was dried to free-flowing powder under reduced pressure. This catalyst had Al/Zr molar ratio of 100 and Zr loading of 0.5 wt %. This catalyst was then tested for 1 hour for ethylene/1-butene copolymerization as described in Example 1; the results are summarized in Table 1.

EXAMPLE 13

Preparation of Supported (1,2-Me"BuCp)₂ZrCl₂

20 g of Davison 948 silica dried to 200° C. was slurried in 250 cm³ heptane in a reaction flask. The flask was cooled to 0° C. and 42 cm³ of 30 wt % methylalumoxane in toluene was added. After 0.5 hours, the temperature was raised to 70° C. and maintained for 3.5 hours. Then a toluene solution of 0.685 g (1,2-Me"BuCp)₂ZrCl₂ as prepared above was added slowly followed by a 1 hour hold of the reaction conditions. Then the resultant catalyst was dried to free-flowing powder under reduced pressure. This catalyst had Al/Zr molar ratio of 120 and Zr loading of 0.45 wt %. This catalyst was then tested for 1 hour for ethylene/1-butene copolymerization as described in Example 1; the results are summarized in Table 1.

EXAMPLE 14

Preparation of Supported {(1,3-Me"BuCp)$_2$ZrCl$_2$/ (1,2-Me"BuCp)$_2$ZrCl$_2$}

20.9 g of Davison 948 silica dried to 200° C. was slurried in 250 cm$^3$ heptane in a reaction flask. The flask was cooled to 0° C. and 46 cm$^3$ of 30 wt % methylalumoxane in toluene was added. After 0.5 hours, the temperature was raised to 70° C. and maintained for 3 hours. Then a toluene solution of 0.35 g (1,3-Me"BuCp)$_2$ZrCl$_2$ mixed with 0.35 g (1,2-Me"BuCp)$_2$ZrCl$_2$ was added slowly followed by a 1 hour hold of the reaction conditions. Then the resultant catalyst was dried to free-flowing powder under reduced pressure. This catalyst had Al/Zr molar ratio of 120 and Zr loading of 0.45 wt %. This catalyst was then tested for 1 hour for ethylene/1-butene copolymerization as described in Example 1; the results are summarized in Table 1.

EXAMPLE 15

Preparation of Supported {(1,2/1,3-MeEtCp)$_2$ZrCl$_2$/ ("PrCp)$_2$ZrCl$_2$}

20 g of Davison 948 silica dried to 200° C. was slurried in 200 cm$^3$ toluene in a reaction flask. The flask was cooled to 0° C. and 55 cm$^3$ of 30wt % methylalumoxane in toluene was added. After 0.5 hours, the temperature was raised to 70° C. and maintained for 3 hours. Then a toluene solution of 0.445 g (1,2/1,3-MeEtCp)$_2$ZrCl$_2$ mixed with 0.445 g ("PrCp)$_2$ZrCl$_2$ was added slowly followed by a 1 hour hold of the reaction conditions. Then the resultant catalyst was dried to free-flowing powder under reduced pressure. This catalyst had Al/Zr molar ratio of 110 and Zr loading of 0.60 wt %. This catalyst was then tested for 0.5 hours for ethylene/1-butene copolymerization as described in Example 1; the results are summarized in Table 2.

EXAMPLE 16

Preparation of Supported {(1,2/1,3-MeEtCp)$_2$ZrCl$_2$/ ("PrCp)$_2$ZrCl$_2$}

590 g of Davison 948 silica dried to 200° C. was slurried in 3000 cm$^3$ heptane in a reaction vessel. The temperature was reduced to 0° C. and 1400 cm$^3$ of 30 wt % methylalumoxane in toluene was added. The temperature was then raised to 70° C. and maintained for 4 hours. Then a toluene solution of 18.55 g (1,2/1,3-MeEtCp)$_2$ZrCl$_2$ mixed with 6.18 g ("PrCp)$_2$ZrCl$_2$ was added slowly followed by a 1 hour hold of the reaction conditions. Then the resultant catalyst was dried to free-flowing powder under reduced pressure. This catalyst had Al/Zr molar ratio of 100 and Zr loading of 0.60 wt %. A sample of this catalyst was then tested for 0.5 hours for ethylene/1-butene copolymerization as described in Example 1; the results are summarized in Table 2.

EXAMPLE 17

A sample of this catalyst was then tested for 1 hour for ethylene/1-butene copolymerization as described in Example 1; the results are summarized in Table 2. The copolymer has a CDBI of 67%.

EXAMPLE 18

Preparation of Supported {(1,2/1,3-MeEtCp)$_2$ZrCl$_2$/ (1,2/1,3-Me"PrCp)$_2$ZrCl$_2$}

10 g of Davison 948 silica dried to 200° C. was slurried in 200 cm$^3$ heptane in a reaction flask. The flask was cooled to 0° C. and 21 cm$^3$ of 30 wt % methylalumoxane in toluene was added. After 0.5 hours, the temperature was raised to 70° C. and maintained for 3 hours. Then a toluene solution of 0.147 g (1,2/1,3-Me"PrCp)$_2$ZrCl$_2$ mixed with 0.136 g (1,2/1,3-MeEtCp)$_2$ZrCl$_2$ was added slowly followed by a 2 hours hold of the reaction conditions. Then the resultant catalyst was dried to free-flowing powder under reduced pressure. This catalyst had Al/Zr molar ratio of 135 and Zr loading of 0.41 wt %. This catalyst was then tested for 1 hour for ethylene/1-butene copolymerization as described in Example 1; the results are summarized in Table 2.

EXAMPLE 19

Preparation of Supported {(1,2/1,3-MeEtCp)$_2$ZrCl$_2$/ (1,3-Me"BuCp)$_2$ZrCl$_2$}

20 g of Davison 948 silica dried to 200° C. was slurried in 250 cm$^3$ heptane in a reaction flask. The flask was cooled to 0° C. and 34 cm$^3$ of 30 wt % methylalumoxane in toluene was added. After 0.5 hours, the temperature was raised to 70° C. and maintained for 3 hours. Then a toluene solution of 0.264 g (1,3-Me"BuCp)$_2$ZrCl$_2$ mixed with 0.237 g (1,2/1,3-MeEtCp)$_2$ZrCl$_2$ was added slowly followed by a 2 hours hold of the reaction conditions. Then the resultant catalyst was dried to free-flowing powder under reduced pressure. This catalyst had Al/Zr molar ratio of 140 and Zr loading of 0.35 wt %. This catalyst was then tested for 1 hour for ethylene/1-butene copolymerization as described in Example 1; the results are summarized in Table 2.

EXAMPLE 20

Preparation of Supported {(1,2/1,3-MeEtCp)$_2$ZrCl$_2$/ (1,3Me"BuCp)$_2$ZrCl$_2$}

20 g of Davison 948 silica dried to 200° C. was slurried in 200 cm$^3$ heptane in a reaction flask. The flask was cooled to 0° C. and 47 cm$^3$ of 30 wt % methylalumoxane in toluene was added. After 0.5 hours, the temperature was raised to 70° C. and maintained for 3 hours. Then a toluene solution of 0.231 g (1,3-Me"BuCp)$_2$ZrCl$_2$ mixed with 0.603 g (1,2/1,3-MeEtCp)$_2$ZrCl$_2$ was added slowly followed by a 1 hour hold of the reaction conditions. Then the resultant catalyst was dried to free-flowing powder under reduced pressure. This catalyst had Al/Zr molar ratio of 100 and Zr loading of 0.60 wt %. This catalyst was then tested for 0.5 hours for ethylene/1-butene copolymerization as described in Example 1; the results are summarized in Table 2.

EXAMPLE 21

Preparation of Supported {(1,2/1,3-MeEtCp)$_2$ZrCl$_2$/ (1,3-Me"BuCp)$_2$ZrCl$_2$}

30 g of Davison 948 silica dried to 200° C. was slurried in 250 cm$^3$ heptane in a reaction flask. The flask was cooled to 0° C. and 59 cm$^3$ of 30 wt % methylalumoxane in toluene was added. After 0.5 hours, the temperature was raised to 70° C. and maintained for 4 hours. Then a toluene solution of 0.826 g (1,3-Me"BuCp)$_2$ZrCl$_2$ mixed with 0.180 g (1,2/1,3-MeEtCp)$_2$ZrCl$_2$ was added slowly followed by a 2 hours hold of the reaction conditions. Then the resultant catalyst was dried to free-flowing powder under reduced pressure. This catalyst had Al/Zr molar ratio of 120 and Zr loading of 0.45 wt %. This catalyst was then tested for 1 hour for ethylene/1-butene copolymerization as described in Example 1; the results are summarized in Table 2.

EXAMPLE 22

Preparation of Supported {(1,2/1,3-MeEtCp)$_2$ZrCl$_2$/ (1,2/1,3-Me"BuCp)$_2$ZrCl$_2$}

20.2 g of Davison 948 silica dried to 200° C. was slurried in 250 cm$^3$ heptane in a reaction flask. The flask was cooled to 0° C. and 40 cm³ of 30 wt % methylalumoxane in toluene was added. After 0.5 hours, the temperature was raised to 70° C. and maintained for 3 hours. Then a toluene solution of 0.359 g (1,2/1,3-Me"BuCp)$_2$ZrCl$_2$ mixed with 0.312 g (1,2/1,3-MeEtCp)$_2$ZrCl$_2$ was added slowly followed by a 2 hours hold of the reaction conditions. Then the resultant catalyst was dried to free-flowing powder under reduced pressure. This catalyst had Al/Zr molar ratio of 120 and Zr loading of 0.45 wt %. This catalyst was then tested for 1 hour for ethylene/1-butene copolymerization as described in Example 1; the results are summarized in Table 2.

EXAMPLE 23

Preparation of Supported {(1,2/1,3-MeEtCp)$_2$ZrCl$_2$/ (1,2/1,3-Me$^i$BuCp)$_2$ZrCl$_2$}

10 g of Davison 948 silica dried to 200° C. was slurried in 200 cm³ heptane in a reaction flask. The flask was cooled to 0° C. and 20 cm³ of 30 wt % methylalumoxane in toluene was added. After 0.5 hours, the temperature was raised to 70° C. and maintained for 3 hours. Then a toluene solution of 0.210 g (1,2/1,3-Me$^i$BuCp)$_2$ZrCl$_2$ mixed with 0.190 g (1,2/1,3-MeEtCp)$_2$ZrCl$_2$ was added slowly followed by a 1 hour hold of the reaction conditions. Then the resultant catalyst was dried to free-flowing powder under reduced pressure. This catalyst had Al/Zr molar ratio of 93 and Zr loading of 0.57 wt %. This catalyst was then tested for 0.5 hours for ethylene/1-butene copolymerization as described in Example 1; the results are summarized in Table 2.

EXAMPLE 24

Preparation of Supported {(1,2/1,3-MeEtCp)$_2$ZrCl$_2$/ (1,3-MeEtCp)$_2$ZrCl$_2$/(1,2/1,3-Me"PrCp)$_2$ZrCl$_2$}

30 g of Davison 948 silica dried to 200° C. was slurried in 250 cm³ heptane in a reaction flask. The flask was cooled to 0° C. and 52 cm³ of 30 wt % methylalumoxane in toluene was added. After 0.5 hours, the temperature was raised to 70° C. and maintained for 3 hours. Then a toluene solution of 0.297 g (1,2/1,3-MeEtCp)$_2$ZrCl$_2$ mixed with 0.223 g (1,3-MeEtCp)$_2$ZrCl$_2$ and 0.240 g (1,2/1,3-Me"PrCp)$_2$ZrCl$_2$, was added slowly followed by a 1.5 hours hold of the reaction conditions. Then the resultant catalyst was dried to free-flowing powder under reduced pressure. This catalyst had Al/Zr molar ratio of 125 and Zr loading of 0.40 wt %. This catalyst was then tested for 1 hour for ethylene/1-butene copolymerization as described in Example 1; the results are summarized in Table 2.

EXAMPLE 25

Preparation of Supported {(1,2/1,3-MeEtCp)$_2$ZrCl$_2$/ ("PrCp)$_2$ZrCl$_2$}

35 g of Davison 948 silica dried to 200° C. was slurried in 200 cm³ heptane in a reaction flask. The flask was cooled to 0° C. and 61 cm³ of 30 wt % methylalumoxane in toluene was added. After 0.5 hours, the temperature was raised to 70° C. and maintained for 4 h. Then a toluene solution of 0.65 g (1,2/1,3-MeEtCp)$_2$ZrCl$_2$ mixed with 0.217 g ("PrCp)$_2$ZrCl$_2$ was added slowly followed by a 1 hour hold of the reaction conditions. Then the resultant catalyst was dried to free-flowing powder under reduced pressure. This catalyst has Al/Zr molar ratio of 125 and Zr loading of 0.40 wt % This catalyst was then tested for 0.75 hours for ethylene/1-butene copolymerization as described in Example 1; the results are summarized in Table 3.

EXAMPLE 26

Preparation of Supported {(1.2/1,3-MeEtCp)$_2$ZrCl$_2$/ ("PrCp)$_2$ZrCl$_2$}

50 g of Davison 948 silica dried to 200° C. was slurried in 300 cm³ heptane in a reaction flask. The flask was cooled to 0° C. and 64 cm³ of 15 wt % trimethylaluminum in heptane was added slowly. After 1 hour, the temperature was raised to 28° C. and then a 65 cm³ toluene solution of mixture of 0.393 g ("PrCp)$_2$ZrCl$_2$ with 1.18 g (1,2/1,3-MeEtCp)$_2$ZrCl$_2$ was added slowly. Then the temperature was raised to 70° C. and maintained for 1 hour. Then 94 cm³ of 30 wt % solution of methylalumoxane in toluene was added followed by a 3 hours hold of the reaction conditions. The resultant catalyst was dried to free-flowing powder under reduced pressure. The catalyst had Al/Zr molar ratio of 125 and Zr loading of 0.40 wt % The catalyst was then tested for 1 hour for ethylene/1-butene copolymerization as described in Example 1; the results are summarized in Table 3.

EXAMPLE 27

Preparation of Supported {(1,2/1,3-MeEtCp)$_2$ZrCl$_2$ (1,3-Me"BuCp))$_2$ZrCl$_2$}

2300 g of Davison 948 silica dried to 200° C. was slurried in 6000 cm³ heptane in a reaction flask. The flask was maintained at 24° C. and 2500 cm³ of 30 wt % methylalumoxane in toluene was added. After 0.5 hours, the temperature was raised to 68° C. and maintained for 4 hours. Then a toluene solution of 24.88 g (1,3-Me"BuCp)$_2$ZrCl$_2$ mixed with 21.64 g (1,2/1,3-MeEtCp)$_2$ZrCl$_2$ was added slowly followed by a 1 hour hold of the reaction conditions. Then the resultant catalyst was washed with hexane 4 times and then dried to free-flowing powder with a gentle N$_2$ flow. This catalyst had Al/Zr molar ratio of 100 and Zr loading of 0.35 wt %. This catalyst was then tested for ethylene/1-butene copolymerization as described in Example 1. After 1 hour, 161 g of polymer was recovered from the seed bed material. The polymer has 1.76 MI, 20.8 melt flow ratio, 0.9181 density, and has <0.05 LCB/1000 carbons.

Comparative Example 34

Comparative Example 34 is linear ethylene-hexene copolymer produced in a gas phase reactor with a silica-supported, (1,3-Me"BuCp)$_2$ZrCl$_2$/methylalumoxane catalyst. MI, density and melt flow ratio are 1.4 dg/min, 0.9214 g/cc, and 17.6, respectively.

Comparative Example 35

Comparative Example 35 is LL-3002 (available from Exxon Chemical Company, Houston, Texas), a commercially available linear ethylene-hexene copolymer produced in a gas phase reactor with a silica-supported titanium based Ziegler-Natta catalyst. The NU and density are 2.0 and 0.919, respectively and a hexane extractable level of 4.58%.

Comparative Example 36

Comparative example 36 is Escorene LL-1001 (available from Exxon Chemical Company, Houston, Tx.), a commercially available linear ethylene-butene copolymer produced in a gas-phase reactor with a silica-supported, titanium-based Ziegler-Natta catalyst. MI, density, and melt flow ratio are 1.04, 0.918, and 25, respectively and less than 0.05 long chain branches/1000 carbons.

Comparative Example 37

Comparative example 37 is Escorene LL-1002 (available from Exxon Chemical Company, Houston, Tx.), a commercially available linear ethylene-butene copolymer produced in a gas-phase reactor with a silica-supported, titanium-based Ziegler-Natta catalyst. N, density, and melt flow ratio are 2.0, 0.918, and 25, respectively.

Comparative Example 38

Comparative example 38 is Escorene LL-3001 (available from Exxon Chemical Company, Houston, Tx.), a commercially available linear ethylene-hexene copolymer produced in a gas-phase reactor with a silica-supported, titanium-based Ziegler-Natta catalyst. MN, density, and melt flow ratio are 0.94, 0.918, and 28, respectively.

Comparative Example 39

Comparative example 39 is Escorene LL-3002 (available from Exxon Chemical Company, Houston, Tx.), a commercially available linear ethylene-hexene copolymer produced in a gas-phase reactor with a silica-supported, titanium-based Ziegler-Natta catalyst. MI, density, and melt flow ratio are 1.86, 0.918, and 28, respectively.

Comparative Example 40

Comparative example 40 is Escorene LL-3003 (available from Exxon Chemical Company, Houston, Tx.), a commercially available linear ethylene-hexene copolymer produced in a gas-phase reactor with a silica-supported, titanium-based Ziegler-Natta catalyst. MI, density, and melt flow ratio are 3.14, 0.918, and 29, respectively.

Comparative Example 41

Comparative example 41 is Escorene LL-8555 (available from Exxon Chemical Company, Houston, Tx.), a commercially available linear ethylene-hexene copolymer produced in a gas-phase reactor with a silica-supported, titanium-based Ziegler-Natta catalyst. MI, density, and melt flow ratio are 6.86, 0.934, and 24, respectively.

Comparative Example 42

Comparative example 42 is Escorene LL4112 (available from Exxon Chemical Company, Houston, Tx.), a linear ethylene-butene copolymer produced in a gas-phase reactor with a silica-supported, chromium-based catalyst. Typical MN, density, and melt flow ratio are 0.76, 0.920, and 80, respectively. The CDBI of this product is 25.9.

Comparative Example 43

Comparative example 43 is LDPE equivalent to Escorene LD-143 (available from Exxon Chemical Company, Houston, Tx.), a commercially available long-chain branched ethylene homopolymer produced in a high-pressure, tubular reactor with a peroxide initiator. MI and density are 2.25 and 0.925, respectively. Typically these LDPE's made in a high pressure reactor have greater than 5 long, dendrite branches/1000 carbons.

Comparative Example 44

Comparative example 44 is Escorene LD-134 (available from Exxon Chemical Company, Houston, Tx.), a commercially available long chain branched ethylene homopolymer produced in a high-pressure, tubular reactor with a peroxide initiator. Typical MN and density are 1.9 and 0.922, respectively.

Comparative Example 45

Comparative example 45 is Dowlex 2045 (available from Dow Chemical Company, Midland, Mich.), a commercially available ethylene-octene copolymer produced in a solution process with a titanium-based Ziegler-Natta catalyst. MI, density, and melt flow ratio are 0.96, 0.920, and 29, respectively.

Comparative Example 46

Comparative example 46 is Affinity PL-1840 (available from Dow Chemical Company, Midland, Mich.), a commercially available ethylene-octene copolymer produced in a solution process with a metallocene catalyst. MI, density, and melt flow ratio are 0.9, 0.909, and 37, respectively. The polymer of this example and the following two comparative examples 47 and 48 are similar polymers described in U.S. Pat. Nos. 5,272,236 and 5,278,272, which are fully incorporated herein by reference.

Comparative Example 47

Comparative example 47 is Affinity PL-1880 (available from Dow Chemical Company, Midland, Mich.), a commercially available ethylene-octene copolymer produced in a solution process with a metallocene catalyst. MI, density, and melt flow ratio are 1,560,903, and 27, respectively.

Comparative Example 48

Comparative example 48 is Affinity PL-1570 (available from Dow Chemical Company, Midland, Mich.), a commercially available ethylene-octene copolymer produced in a solution process with a metallocene catalyst. Target MI and density are 1.0 and 0.915, respectively.

Comparative Example 49

Comparative example 49 is linear ethylene-hexene copolymer produced in a high pressure process with a dimethyl silicon-bridged bis(indenyl) zirconium dichloride/methyl alumoxane catalyst. MI, density, and melt flow ratio are 1.4, 0.920, and 15, respectively.

Comparative Example 50

Comparative example 50 is linear ethylene-hexene copolymer produced in a high pressure process with a dimethyl silicon-bridged bis(indenyl) zirconium dichloride/methyl alumoxane catalyst. MI, density, and melt flow ratio are 2.38, 0.920, and 15, respectively.

Comparative Example 51

Comparative example 51 is linear ethylene-hexene copolymer produced in a gas phase process with a silica-supported, $(1,3\text{-Me}''\text{BuCp})_2\text{ZrCl}_2$/methyl alumoxane catalyst. Ml, density, and melt flow ratio are 1.73, 0.919, and 17, respectively.

Comparative Example 52

Comparative example 52 is linear ethylene-hexene copolymer produced in a gas phase process with a silica-supported, $(1,3\text{-Me}''\text{BuCp})_2\text{ZrCl}_2$/methyl alumoxane catalyst. MI, density, and melt flow ratio are 1.05, 0.921, and 17.5, respectively.

Comparative Example 53

Comparative example 53 is linear ethylene-hexene copolymer produced in a gas phase process with a silica-supported, ("BuCp)$_2$ZrCl$_2$/methyl alumoxane catalyst. MI, density, and melt flow ratio are 3.23, 0.931, and 17, respectively.

Comparative Example 54

Comparative example 54 is linear ethylene-hexene copolymer produced in a gas phase process with a silica-supported, ("BuCp)$_2$ZrCl$_2$/methyl alumoxane catalyst. MI, density, and melt flow ratio are 1.91, 0.918, and 16, respectively.

Comparative Example 55

Comparative example 55 is a 65:35 (A:B) blend of two ethylene-hexene copolymers, each produced in a gas-phase reactor with a silica-supported, ("BuCp)$_2$ZrCl$_2$/methyl alumoxane catalyst. Component A is a 0.57 MI/0.906 density copolymer; component B is a 311 MI /0.945 density copolymer. The blend ML density, and melt flow ratio are 1.54; 0.920; and 28, respectively. This example and the following comparative examples 55–57 are representative blends of PCT publication WO 90/03414, published Apr. 5, 1990 and U.S. application Ser. No. 08/014,094, filed Feb. 4, 1994, which are herein incorporated by reference.

Comparative Example 56

Comparative example 56 is an 80:20 (A:B) blend of two ethylene-hexene copolymers, each produced in a gas-phase reactor with a silica-supported, ("BuCp)$_2$ZrCl$_2$/methyl alumoxane catalyst. Blend component A is 0.86 MI/0.904 density copolymer; component B is a 20 MI/0.948 density copolymer. The blend MI, density, and melt flow ratio are 1.35; 0.919; and 26, respectively.

Comparative Example 57

Comparative example 57 is a 67:33 (A:B) blend of two ethylene-hexene copolymers, each produced in a gas-phase reactor with a silica-supported, ("BuCp)$_2$ZrCl$_2$/methyl alumoxane catalyst. Blend component A is a 1.45 MN/0.907 density copolymer; component B is a 17.7 MI/0.949 density copolymer. The blend MI, density, and melt flow ratio are 2.09; 0.921; and 19, respectively.

Comparative Example 58

Comparative example 58 is a 67:33 (A:B) blend of two ethylene-hexene copolymers, each produced in a gas-phase reactor with a silica-supported, (1,3-Me"BuCp)$_2$ZrCl$_2$/methyl alumoxane catalyst. Blend component A is a 0.89 MI/0.907 density copolymer; component B is a 32 MI/0.940 density copolymer. The blend MI, density, and melt flow ratio are 2.19; 0.919; and 22, respectively.

Comparative Example 59

Comparative example 59 is Hizex 6200B (available from Mitsui Petrochemical Company, Tokyo, Japan), a commercially available linear polyethylene produced in a series reactor slurry process with a titanium-based Ziegler-Natta catalyst. MI, density, and melt flow ratio are 0.39, 0.956, and 84, respectively.

Comparative Example 60

Comparative example 60 is Asahi's B970 (available from Asahi Petrochemical Company, Tokyo, Japan), a commercially available linear polyethylene produced in a series reactor slurry process with a titanium-based Ziegler-Natta catalyst. MI, density, and melt flow ratio are 0.21, 0.955, and 81, respectively.

Comparative Example 61

Comparative example 61 is Asahi's B870 (available from Asahi Petrochemical Company, Tokyo, Japan), a commercially available linear polyethylene produced in a series reactor slurry process with a titanium-based Ziegler-Natta catalyst. MI, density, and melt flow ratio are 0.31, 0.957, and 98, respectively.

Comparative Example 62

Comparative example 62 is Asahi's B871 (available from Asahi Petrochemical Company, Tokyo, Japan), a commercially available linear polyethylene produced in a series reactor slurry process with a titanium-based Ziegler-Natta catalyst. MI, density, and melt flow ratio are 0.31, 0.957, and 83, respectively.

Comparative Example 63

Comparative example 63 is Alathon L-5840 (available from DuPont de Nemours Company, Wilmington, Del.), a commercially available linear polyethylene produced in a series reactor slurry process with a titanium-based Ziegler-Natta catalyst. MI, density, and melt flow ratio are 0.38, 0.957, and 81, respectively.

Comparative Example 64

Comparative example 64 is Marlex 5502 (available from Phillips Petroleum Company, Borthesville, Okla.), a commercially available linear polyethylene produced in a slurry loop process with a chromium-based catalyst. MI, density, and melt flow ratio are 0.43, 0.955, and 79, respectively.

Comparative Example 65

Comparative example 65 is Allied's AB-55–003 (available from Allied Chemical Corporation, Morristown, N.J.), a commercially available linear polyethylene produced in a slurry loop process with a chromium-based catalyst. MI, density, and melt flow ratio are 0.3, 0.955, and 100, respectively.

Example 66

Example 66 is an ethylene-hexene copolymer produced in a gas-phase reactor with a silica-supported, mixed metallocene/methyl alumoxane catalyst. The metallocene mixture is 50% (1,3-Me"BuCp)$_2$ZrCl$_2$ and 50% of an isomeric mixture of (1,2/1,3-MeEtCp)$_2$ZrCl$_2$. MI, density, and melt flow ratio are 0.86, 0.916, and 21, respectively.

Example 67

Example 67 is ethylene-hexene copolymer produced in a gas-phase reactor with a silica-supported, mixed metallocene/methyl alumoxane catalyst. The metallocene mixture is 50% (1,2/1,3-Me"BuCp)$_2$ZrCl$_2$ and 50% of an isomeric mixture of (1,2/1,3-MeEtCp)$_2$ZrCl$_2$. MI, density, and melt flow ratio are 0.91, 0.919, and 23.

Example 68

Example 68 is ethylene-hexene copolymer produced in a gas-phase reactor with a silica-supported, mixed metallocene/methyl alumoxane catalyst. The metallocene is an isomeric mixture (1,2l1,3-MeEtCp)$_2$ZrCl$_2$. MI, density, and melt flow ratio are 1.16, 0.921, and 31, respectively and a hexane extractable level of 1.37%.

Example 69

Example 69 is ethylene-hexene copolymer produced in a gas-phase reactor with a silica-supported, (iPrCp)$_2$ZrCl$_2$/methyl alumoxane catalyst. MI and density are 1.39 and 0.918, respectively.

Example 70

Example 70 is ethylene-butene copolymer produced in a gas-phase reactor with a silica-supported, mixed metallocene/methyl alumoxane catalyst. The metallocene mixture is 25% ("PrCp)$_2$ZrCl$_2$ and 75% (1,211,3-MeEtCp)$_2$ZrCl$_2$ MI, density, and melt flow ratio are 1.48, 0.922, and 26, respectively.

Example 71

Example 71 is ethylene-hexene copolymer produced in a gas-phase reactor with a silica-supported, mixed metallocene/methyl alumoxane catalyst. The metallocene mixture is 50% (1,3-Me"BuCp)$_2$ZrCl$_2$ and 50% (1,2/1,3-MeEtCp)$_2$ZrCl$_2$. MI, density, and melt flow ratio are 1.57, 0.922, and 18, respectively.

Example 72

Example 72 is ethylene-hexene copolymer produced in a gas-phase reactor with a silica-supported, mixed metallocene/methyl alumoxane catalyst. The metallocene mixture is 40% ("PrCp)$_2$ZrCl$_2$ and 60% (1,2/1,3-MeEtCp)$_2$ZrCl$_2$. ML density, and melt flow ratio are 2.18, 0.922, and 22, and a CDBI of 67%.

Example 73

Example 73 is ethylene-butene copolymer produced in a gas-phase reactor with a silica-supported, mixed metallocene/methyl alumoxane catalyst. The metallocene mixture is 50% (1,3-Me"BuCp)$_2$ZrCl$_2$ and 50% (1,2/1,3-MeEtCp)$_2$ZrCl$_2$. MI, density, and melt flow ratio are 2.5, 0.924, and 19, respectively and a hexane extractable level of 0.76%, respectively and less than 0.05 long chain branches per 1000 carbons.

Example 74

Example 74 is an experimental ethylene-hexene copolymer produced in a gas-phase reactor with a silica-supported, mixed metallocene/methyl alumoxane catalyst. The metallocene mixture is 40% ("PrCp)ZrCl$_2$ and 60% (1,2/1,3-MeEtCp)$_2$ZrCl$_2$. MI, density, and melt flow ratio are 3.0, 0.924, and 21, respectively.

Example 75

Example 75 is an experimental ethylene-hexene copolymer produced in a gas-phase reactor with a silica-supported, mixed metallocene/methyl alumoxane catalyst. The metallocene mixture is 50% (1,3-Me"BuCp)$_2$ZrCl$_2$ and 50% (1,2/1,3-MeEtCp)$_2$ZrCl$_2$. MI, density, and melt flow ratio are 1.24, 0.919, and 21.3, respectively and a hexane extractable level of 0.59%.

Example 76

Example 76 is an experimental ethylene-hexene copolymer produced in a gas-phase reactor with a silica-supported, mixed metallocene/methyl alumoxane catalyst. The metallocene mixture is 25% ("PrCp)ZrCl$_2$ and 75% (1,2/1,3-MeEtCp)$_2$ZrCl$_2$. MN, density, and melt flow ratio are 1.98, 0.919, and 23.0, respectively and less than 0.05 long chain branches/1000 carbons.

Example 77

Example 77 is an experimental ethylene-hexene copolymer produced in a gas-phase reactor with a silica-supported, mixed metallocene/methyl alumoxane catalyst. The metallocene mixture is 25% ("PrCp)ZrCl$_2$ and 75% (1,2/1,3-MeEtCp)$_2$ZrCl$_2$. MI, density, and melt flow ratio are 1.48, 0.918, and 26.9, respectively.

Example 78

Example 78 is an experimental ethylene-hexene copolymer produced in a gas-phase reactor with a silica-supported, mixed metallocene/methyl alumoxane catalyst. The metallocene mixture is 25% ("PrCp)ZrCl$_2$ and 75% (1,2/1,3-MeEtCp)$_2$ZrCl$_2$. Ml, density, and melt flow ratio are 2.4, 0.919, and 22.2, respectively.

Example 79

Example 79 is an experimental ethylene-hexene copolymer produced in a gas-phase reactor with a silica-supported, mixed metallocene/methyl alumoxane catalyst. The metallocene mixture is 50% (1,3-Me"BuCp)$_2$ZrCl$_2$ and 50% (1,2/1,3-MeEtCp)$_2$ZrCl$_2$. MI, density, and melt flow ratio are 2.21, 0.919, and 19.0, respectively.

Example 80

Example 80 is an ethylene-hexene copolymer produced in a gas-phase reactor with a silica-supported, mixed metallocene/methyl alumoxane catalyst. The metallocene mixture is 25% ("PrCp)$_2$ZrCl$_2$ and 75% (1,2/1,3-MeEtCp)$_2$ZrCl$_2$. MI, density, and melt flow ratio are 1.44, 0.917, and 30.3, respectively.

Table 4 includes the two key GPC moments (Mw and Mz) for each example from each category, plus some key distinctions between the product families. Note that the high molecular weight component of the invention, reflected by its Mz, is less than the Ziegler-Natta products at equivalent MI, and that the high melt strength butene copolymer examples of the invention essentially contains no detectable long-chain branching.

While the present invention has been described and illustrated by reference to particular embodiments, it will be appreciated by those of ordinary skill in the art that the invention lends itself to variations not necessarily illustrated herein. For example, it is not beyond the scope of this invention to mix at least two of the catalysts of this invention or mix the catalyst of this invention with any other metallocene catalyst. For this reason, then, reference should be made solely to the appended claims for purposes of determining the true scope of the present invention.

TABLE 1

METALLOCENE CATALYSTS BASED ON MIXTURE OF ISOMERS

| Example | Metallocene | Catalyst Activity (1) | Density | $I_2$ ($I_{21}$) | $I_{21}/I_2$ | $M_w$ | $M_w/M_n$ | Zr wt % | Al/Zr molar | Temp. °C | Note |
|---|---|---|---|---|---|---|---|---|---|---|---|
| 1 | $(1,2/1,3\text{-MeEtCp})_2ZrCl_2$ | 1015 | 0.9318 | 1.1 | 38.7 | 96200 | 5.2 | 0.35 | 140 | 70 | 2 |
| 2 | " | 848 | 0.9286 | 0.4 | 36.5 | 117100 | 6.2 | 0.60 | 120 | 70 | 2 |
| 3 | " | 937 | 0.9264 | 1.3 | 46.5 | 93000 | 4.3 | 0.60 | 120 | 80 | 2 |
| 4 | " | 859 | 0.9296 | 0.6 | 32.9 | 106500 | 5.1 | 0.60 | 100 | 70 | 2 |
| 5 | " | 864 | 0.9302 | 0.4 | 41.3 | 115100 | 6.0 | 0.60 | 90 | 70 | 2 |
| 6 | " | 1269 | 0.9304 | 0.2 | 43.3 | 120000 | 6.2 | 0.60 | 100 | 70 | 3 |
| 7 | $(1,2/1,3\text{-Me}^n\text{PrCp})_2ZrCl_2$ | 1929 | 0.9161 | 3.6 | 21.2 | 79300 | 3.6 | 0.55 | 120 | 70 | 3 |
| 8 | $(1,2/1,3\text{-Me}^n\text{BuCp})_2ZrCl_2$ | 2155 | 0.9151 | 4.6 | 21.4 | 71100 | 3.4 | 0.45 | 120 | 70 | 3 |
| 9 | $(1,2/1,3\text{-Me}^i\text{BuCp})_2ZrCl_2$ | 1135 | 0.9402 | 6.0 | 22.4 | 62800 | 3.4 | 0.60 | 120 | 70 | 2 |
| 10 | $(1,3\text{-MeEtCp})_2ZrCl_2$ | 874 | 0.9155 | (7.1) | — | 127900 | 2.7 | 0.45 | 120 | 70 | 3 |
| 11 | $(^n\text{PrCp})_2ZrCl_2$ | 2929 | 0.9465 | 5.3 | 23.2 | 61500 | 3.3 | 0.40 | 120 | 70 | 2 |
| 12 | $(1,3\text{-Me}^n\text{BuCp})_2ZrCl_2$ | 1837 | 0.9162 | 1.0 | 17.9 | 103000 | 2.5 | 0.50 | 100 | 70 | 2 |
| 13 | $(1,2\text{-Me}^n\text{BuCp})_2ZrCl_2$ | 1880 | 0.9195 | 5.1 | 18.2 | 69600 | 3.7 | 0.45 | 120 | 70 | 3 |
| 14 | $(1,2\text{-Me}^n\text{BuCp})_2ZrCl_2$ + $(1,3\text{-Me}^n\text{BuCp})_2ZrCl_2$ | 2326 | 0.9126 | 3.5 | 19.6 | 77300 | 3.1 | 0.45 | 120 | 70 | 3, 4 |

(1) $g_{PE}/(g_{CAT} * \text{hours} * 150 \text{ psi})$
(2) Toluene used as solvent
(3) Heptane used as solvent
(4) 1:1 mixture of the 2 compounds

TABLE 2

MIXED-METALLOCENE CATALYSTS BASED ON MIXTURE OF ISOMERS

| Example | Metallocene Combination | Ratio of Components | Catalyst Activity (1) | Density | $I_2$ | $I_{21}/I_2$ | Zr wt % |
|---|---|---|---|---|---|---|---|
| 15 | $(1,2/1,3\text{-MeEtCp})_2ZrCl_2$ + $(^n\text{PrCp})_2ZrCl_2$ | 50:50 | 1978 | 0.9201 | 1.8 | 21.9 | 0.60 |
| 16 | $(1,2/1,3\text{-MeEtCp})_2ZrCl_2$ + $(^n\text{PrCp})_2ZrCl_2$ | 75:25 | 1027 | 0.9278 | 2.0 | 26.6 | 0.60 |
| 17 | $(1,2/1,3\text{-MeEtCp})_2ZrCl_2$ + $(^n\text{PrCp})_2ZrCl_2$ | 75:25 | 1258 | 0.9155 | 2.5 | 24.9 | 0.60 |
| 18 | $(1,2/1,3\text{-MeEtCp})_2ZrCl_2$ + $(1,2/1,3\text{-Me}^n\text{PrCp})_2ZrCl_2$ | 50:50 | 1354 | 0.9196 | 1.7 | 24.3 | 0.41 |
| 19 | $(1,2/1,3\text{-MeEtCp})_2ZrCl_2$ + $(1,3\text{-Me}^n\text{BuCp})_2ZrCl_2$ | 50:50 | 1564 | 0.9104 | 1.2 | 21.9 | 0.35 |
| 20 | $(1,2/1,3\text{-MeEtCp})_2ZrCl_2$ + $(1,3\text{-Me}^n\text{BuCp})_2ZrCl_2$ | 75:25 | 1132 | 0.9283 | 1.2 | 29.3 | 0.60 |
| 21 | $(1,2/1,3\text{-MeEtCp})_2ZrCl_2$ + $(1,3\text{-Me}^n\text{BuCp})_2ZrCl_2$ | 20:80 | 1867 | 0.9165 | 2.2 | 21.9 | 0.45 |
| 22 | $(1,2/1,3\text{-MeEtCp})_2ZrCl_2$ + $(1,2\text{-Me}^n\text{BuCp})_2ZrCl_2$ | 50:50 | 1411 | 0.9189 | 3.8 | 21.2 | 0.45 |
| 23 | $(1,2/1,3\text{-MeEtCp})_2ZrCl_2$ + $(1,2/1,3\text{-Me}^i\text{BuCp})_2ZrCl_2$ | 50:50 | 1274 | 0.9290 | 3.4 | 26.3 | 0.56 |
| 24 | $(1,2/1,3\text{-MeEtCp})_2ZrCl_2$ + $(1,3\text{-MeEtCp})_2ZrCl_2$ + $(1,2/1,3\text{-Me}^n\text{PrCp})_2ZrCl_2$ | 40:30:30 | 660 | 0.9181 | 0.3 | 28.5 | 0.40 |

(1) $g_{PE}/(g_{CAT} * \text{hours} * 150 \text{ psi})$

TABLE 3

| Example | Metallocene | Catalyst Activity (1) | Density | $I_2$ | $I_{21}/I_2$ | $M_w$ | $M_w/M_n$ | Zr wt % | Al/Zr molar | Temp. °C | Note |
|---|---|---|---|---|---|---|---|---|---|---|---|
| 25 | $(1,2/1,3\text{-MeEtCp})_2ZrCl_2$ + $(^n\text{PrCp})_2ZrCl_2$ | 1376 | 0.9233 | 4.0 | 22.5 | 73500 | 4.2 | 0.4 | 120 | 70 | 2 |
| 26 | $(1,2/1,3\text{-MeEtCp})_2ZrCl_2$ + $(^n\text{PrCp})_2ZrCl_2$ | 907 | 0.9193 | 0.7 | 32.0 | 104200 | 4.9 | 0.4 | 120 | 70 | 3 |

(1) $g_{PE}/(g_{CAT} * \text{hours} * 150 \text{ psi})$
(2) {$SiO_2$ + MAO} + Metallocenes
(3) {[$SiO_2$ + TMA] + Metallocenes} + MAO

TABLE 4

| | MI dg/min | Melt MIR (I$_{21}$/I$_2$) | Strength (cN) | Mn | Mw | Mz | Mw/Mn | Mz/Mw |
|---|---|---|---|---|---|---|---|---|
| Conventional Metallocenes | | | | | | | | |
| 34 | 1.4 | | 2.8 | 25200 | 86000 | 173400 | 3.41 | 2.02 |
| 46 | 0.9 | 36.6 | 5.45 | 38480 | 77300 | — | 2.00 | — |
| 47 | 1.56 | 27.1 | 3.8 | 38700 | 76800 | — | 2.04 | — |
| 48 | 1.0 | — | 5.4 | 38700 | 80000 | 208760 | 3.07 | 1.70 |
| 49 | 1.4 | 14.7 | 2.8 | 34670 | 93300 | 151000 | 2.69 | 1.62 |
| 50 | 2.38 | 15.4 | 2.0 | 26830 | 81000 | 133000 | 3.02 | 1.64 |
| 51 | 1.73 | 16.9 | 2.8 | 28700 | 86300 | 152000 | 3.01 | 1.76 |
| 52 | 1.05 | 17.8 | 2.9 | 24500 | 100000 | 194000 | 4.07 | 1.94 |
| 53 | 3.23 | 17.2 | 2.0 | 33300 | 78700 | 137000 | 2.36 | 1.74 |
| 54 | 1.91 | 15.8 | 2.6 | 38850 | 89800 | 154000 | 2.31 | 1.72 |
| 55 | 1.54 | 28.4 | 3.23 | 17835 | 86500 | 202000 | 4.85 | 2.34 |
| 56 | 1.35 | 26.1 | 3.73 | 17990 | 91200 | 208000 | 5.07 | 2.28 |
| 57 | 2.09 | 18.6 | 2.8 | 28780 | 82600 | 149500 | 2.87 | 1.81 |
| 58 | 2.19 | 21.6 | 2.4 | 15140 | 83400 | 173000 | 5.51 | 2.07 |
| Invention | | | | | | | | |
| 66 | 0.86 | 20.7 | 12.1 | 35600 | 101500 | 221100 | 2.85 | 2.18 |
| 67 | 0.91 | 23.2 | 10.9 | 31900 | 98600 | 231700 | 3.08 | 2.35 |
| 68 | 1.16 | 31.4 | 7.5 | 23300 | 86100 | 200000 | 3.69 | 2.32 |
| 69 | 1.39 | — | 9.4 | 12870 | 103000 | 409800 | 8.00 | 3.98 |
| 70 | 1.48 | 26.6 | 6.2 | 26500 | 83200 | 184000 | 3.14 | 2.21 |
| 71 | 1.57 | 18.5 | 8.4 | 31600 | 89100 | 198000 | 2.81 | 2.22 |
| 72 | 2.18 | 21.6 | 5.25 | 27400 | 78700 | 169000 | 2.87 | 2.15 |
| 73 | 2.5 | 19.2 | 4.55 | 22400 | 81800 | 174500 | 3.66 | 2.13 |
| 74 | 3.0 | 20.9 | 3.6 | 24400 | 75800 | 168200 | 3.11 | 2.22 |
| 75 | 1.24 | 21.3 | 5.9 | 30100 | 93200 | 210000 | 3.10 | 2.25 |
| 76 | 1.98 | 23.0 | — | 31000 | 88400 | 200000 | 2.85 | 2.26 |
| 77 | 1.48 | 26.9 | — | 28100 | 90100 | 199800 | 3.21 | 2.22 |
| 78 | 2.40 | 22.2 | — | 27100 | 80400 | 169200 | 2.97 | 2.10 |
| 79 | 2.21 | 19.0 | — | 30400 | 83500 | 191000 | 2.75 | 2.29 |
| 80 | 1.44 | 30.3 | — | 29230 | 85700 | 184700 | 2.93 | 2.16 |
| Broad MWD | | | | | | | | |
| 42 | 0.76 | 80 | 8.3 | 10060 | 105000 | 563000 | 10.4 | 5.36 |
| 59 | 0.39 | 84 | 7.6 | 13500 | 142000 | 636000 | 10.6 | 4.48 |
| 60 | 0.21 | 81 | 11.7 | 8200 | 204000 | 778000 | 24.8 | 3.81 |
| 61 | 0.31 | 97 | 9 | 10600 | 161000 | 838000 | 15.2 | 5.2 |
| 62 | 0.31 | 82 | 10.3 | 9000 | 156000 | 764000 | 17.3 | 4.9 |
| 63 | 0.38 | 81 | 10.1 | 16900 | 167000 | 990000 | 9.9 | 5.93 |
| 64 | 0.43 | 79 | 11 | 25000 | 135000 | 679000 | 5.6 | 5.03 |
| 65 | 0.3 | 100 | 11.4 | — | — | — | — | — |
| LDPE | | | | | | | | |
| 43 | 2.25 | | 6.5 | | 82200 (1) | — | — | |
| 44 | 1.9 | | 8.4 | | 87000 (1) | — | — | |
| Ziegler-Natta | | | | | | | | |
| 35 | 2.0 | — | 3.1 | 23700 | 100160 | 309500 | 4.22 | 3.09 |
| 36 | 1.04 | 26.3 | 4.6 | 33800 | 116000 | 324000 | 3.42 | 2.79 |
| 37 | 2.0 | — | 2.8 | 27100 | 96500 | 269000 | 3.56 | 2.79 |
| 38 | 0.94 | 27.4 | 5.2 | 24780 | 121000 | 415000 | 4.88 | 3.43 |
| 39 | 1.86 | 28.2 | 3.0 | 18000 | 98900 | 322000 | 5.49 | 3.26 |
| 40 | 3.14 | 29.3 | 2.0 | 17600 | 85900 | 271000 | 4.88 | 3.15 |
| 41 | 6.86 | 24.3 | 1.0 | 16750 | 70600 | 217000 | 4.21 | 3.07 |
| 45 | 0.96 | 29.4 | 4.7 | 28000 | 114400 | 438000 | 4.09 | 3.83 |

(1) not corrected for long chain branching

TABLE 5

| | Example | | | | | | | | |
|---|---|---|---|---|---|---|---|---|---|
| | 66 | 67 | 70 | 71 | 72 | 73 | 74 | 75 | 76 |
| MI dg/min | 0.86 | 0.91 | 1.48 | 1.57 | 2.18 | 2.5 | 3.0 | 1.24 | 2.0 |
| Density g/cc | 0.916 | 0.919 | 0.9224 | 0.922 | 0.9216 | 0.924 | 0.9239 | 0.9194 | 0.919 |
| Comonomer | C6 | C6 | C4 | C6 | C6 | C4 | C6 | C6 | C4 |

TABLE 5-continued

| Film Mfg. Conditions (1) | | | | | | | | | | |
|---|---|---|---|---|---|---|---|---|---|---|
| Die Gap (mils) | | 60 | 60 | 30 | 60 | 60 | 30 | 60 | 60 | 30 |
| Melt Temperature (° F.) | | 393 | 389 | 380 | 384 | 391 | 405 | 372 | 402 | 409 |
| Film Properties | | | | | | | | | | |
| Tensile @ Yield (psi) | MD | 1340 | 1550 | 1532 | 1590 | 1610 | 1640 | 1740 | 1530 | 1220 |
| | TD | 1260 | 1610 | 1670 | 1800 | 1760 | 1690 | 1930 | 1720 | 1250 |
| Tensile @ Break (psi) | MD | 8170 | 8200 | 4880 | 7710 | 7700 | 4250 | 6040 | 7890 | 3870 |
| | TD | 7840 | 7060 | 4467 | 7230 | 6640 | 3980 | 5440 | 7930 | 3860 |
| Elongation @ Yield (%) | MD | 6.0 | 5.7 | 5.6 | 5.6 | 5.6 | 5.6 | 5.3 | 5.5 | 5.7 |
| | TD | 5.5 | 5.5 | 5.5 | 5.5 | 5.5 | 5.4 | 5.4 | 5.4 | 5.6 |
| Elongation @ Break (%) | MD | 434 | 454 | 606 | 523 | 550 | 678 | 569 | 480 | 626 |
| | TD | 596 | 582 | 675 | 632 | 649 | 687 | 655 | 618 | 639 |
| 1% Sec. Modulus (kpsi) | MD | 27.1 | 33.3 | 40 | 38.8 | 40.0 | 47.4 | 44.9 | 38.2 | 32.2 |
| | TD | 32.2 | 41.1 | 45 | 44.8 | 44.2 | 48.3 | 51.8 | 44.3 | 33.2 |
| Puncture Force (lb/mil) | | 6.94 | 6.98 | 6.8 | 6.53 | 8.38 | 5.97 | 6.83 | 8.69 | 6.05 |
| Puncture Energy (in-lb/mil) | | 15.7 | 14.5 | 11.6 | 12.35 | 18.8 | 8.3 | 12.0 | 19.4 | 11.7 |
| Haze (%) | | 10.6 | 10.3 | 9.0 | 6.6 | 5.3 | 6.4 | 7.3 | 7.8 | 5.1 |
| Gloss | | 45 | 45 | 50 | 59 | 70 | 63 | 61 | 56 | 67 |
| Gauge (mil) | | 1.07 | 1.02 | 1.16 | 1.03 | 1.10 | 1.5 | 1.05 | 1.07 | 1.5 |
| I/I Reblock (g) | | 72.3 | 31.0 | 46 | 52.0 | — | 49 | 54.5 | — | 158 |
| Elmendorf Tear (g/mil) | MD | 83.1 | 44.8 | 23 | 90.5 | 118 | 30 | 97.9 | 95.8 | 63 |
| | TD | 323 | 398 | 204 | 458 | 543 | 129 | 553 | 436 | 192 |
| Dart Impact (g/mil) | | 679 | 366 | 79 | 179 | 142 | 68 | 107 | 365 | 110 |

| | | | | | Example | | |
|---|---|---|---|---|---|---|---|
| | | 77 | 78 | 79 | 80 | 34 Control #1 | 35 Control #2 |
| MI dg/min | | | 1.48 | 2.4 | 2.2 | 1.44 | 1.40 | 2.0 |
| Density g/cc | | | 0.918 | 0.919 | 0.919 | 0.917 | 0.9214 | 0.919 |
| Comonomer | | | C6 | C6 | C4 | C6 | C6 | C6 |
| Film Mfg. Conditions (1) | | | | | | | | |
| Die Gap (mils) | | | 30 | 30 | 30 | 30 | 60 | 60 |
| Melt Temperature (° F.) | | | 410 | 405 | 409 | 408 | 403 | 388 |
| Film Properties | | | | | | | | |
| Tensile @ Yield (psi) | MD | | 1250 | 1280 | 1330 | 1240 | 1435 | 1436 |
| | TD | | 1340 | 1340 | 1430 | 1230 | 1465 | 1566 |
| Tensile @ Break (psi) | MD | | 7460 | 7030 | 4150 | 7290 | 8758 | 7178 |
| | TD | | 7080 | 6800 | 4350 | 6450 | 7090 | 6090 |
| Elongation @ Yield (%) | MD | | 5.9 | 6.0 | 5.9 | 5.7 | 5.9 | 5.6 |
| | TD | | 5.8 | 5.7 | 5.6 | 5.6 | 5.8 | 5.4 |
| Elongation @ Break (%) | MD | | 557 | 596 | 642 | 558 | 615 | 710 |
| | TD | | 653 | 678 | 715 | 648 | 640 | 809 |
| 1% Sec. Modulus (kpsi) | MD | | 29.2 | 28.8 | 35.2 | 28.6 | — | — |
| | TD | | 32.4 | 31.8 | 39.0 | 31.8 | — | — |
| Puncture Force (lb/mil) | | | 9.0 | 9.1 | 6.12 | 9.3 | — | — |
| Puncture Energy (in-lb/mil) | | | 24.6 | 25.7 | 10.9 | 25.8 | — | — |
| Haze (%) | | | 5.0 | 4.0 | 5.9 | 4.6 | 16 | 20 |
| Gloss | | | 69 | 78 | 64 | 72 | 46 | 35 |
| Gauge (mil) | | | 0.96 | 0.92 | 1.5 | 0.91 | 1.51 | 1.54 |
| I/I Reblock (g) | | | 183 | 208 | 151 | 189 | 131 | 177 |
| Elmendorf Tear (g/mil) | MD | | 152 | 203 | 43 | 172 | 291 | 332 |
| | TD | | 512 | 538 | 155 | 508 | 435 | 539 |
| Dart Impact (g/mil) | | | 419 | 254 | 96 | 438 | 462 | 123 |

(1) 2 1/2" (6.35 cm) Blown film line, LLDPE screw, 70 rpm, 2.5 BUR

TABLE 6

|  |  | Example | | |
|---|---|---|---|---|
|  |  | 40 | 72 | 74 |
| MI/Density dg/min/g/cc |  | 3/ 0.917 | 2.18/ 0.9216 | 3.0/ 0.9239 |
| Comonomer |  | Hexene | Hexene | Hexene |
| Film Properties |  |  |  |  |
| Tensile @ Yield psi) | MD | 1300 | 1280 | 1420 |
|  | TD | 1200 | 1240 | 1400 |
| Tensile @ Break (psi) | MD | 8970 | 8940 | 8280 |
|  | TD | 5350 | 5680 | 5500 |
| Elongation @ Yield (%) | MD | 6.0 | 6.0 | 5.8 |
|  | TD | 5.6 | 6.1 | 6.0 |
| Elongation @ Break (%) | MD | 547 | 431 | 483 |
|  | TD | 776 | 650 | 649 |
| 1% Secant Modulus (kpsi) | MD | 25.3 | 25.6 | 32.5 |
|  | TD | 26.6 | 29.2 | 34.1 |
| Puncture Peak Force (lb/mil) |  | 6.64 | 8.11 | 7.81 |
| Puncture Break Energy (in-lb/mil) |  | 20.2 | 19.4 | 16.8 |
| Haze (%) |  | 1.2 | 1.7 | 1.0 |
| Gloss |  | 95 | 87 | 94 |
| Gauge mil ($\mu$) |  | 0.84 (21) | 0.79 (20) | 0.80 (20) |
| I/I Reblock (g) |  | 130.7 | 159.7 | 158.5 |
| Elmendorf Tear (g/mil) | MD | 166 | 51.8 | 94.9 |
|  | TD | 937 | 579 | 659 |
| Dart Impact (g/mil) |  | 117 | 206 | 119 |
| PPT (kgf) | MD | 2.15 | 2.44 | 2.25 |
|  | TD | 3.04 | 2.84 | 2.83 |
| Tensile @ 200% Elongation (psi) | MD | 1820 | 2970 | 2620 |

Note:
3 1/2" (8.9 cm) Black Clawson cast film line, 507–526° F. (264–274° C.) melt temperature, 500 feet/min (254 cm/min)

We claim:

1. A method for producing a catalyst system, said method comprising the steps of:
   (a) producing a set of components in-situ to form a product, said product comprising:
      (i) a first component comprising at least one transition metal of Group IV, V or VI and at least two cyclopentadienyl containing rings, said rings each having at least two substituents bonded to each of said rings in the same position;
      (ii) a second component comprising said transition metal and said cyclopentadienyl containing rings, said rings each having at least two substituents bonded to each of said rings in the same or different position than said substituents of said first component; said substituents of the said first and second components are the same or different, with the provision that when the substituents of said first and second components are the same, said substituents of said components are bonded to said rings in different positions; and
      (iii) a third component comprising said transition metal bonded to said cyclopentadienyl containing rings where one of said rings is substituted identically as said first component and another of said rings is substituted identically as said second component;
   wherein producing said set of components comprises the step of producing a first, second, and third component simultaneously wherein producing a component comprises:
      (i) providing a transition metal;
      (ii) providing at least two cyclopentadienyl containing rings; and
      (iii) combining the transtition metal and the rings; and
   (b) introducing a cocatalyst or an activator.

2. The method of claim 1 wherein said components are represented by the following formula:

$$T_b(R_sL)_rMD_dA_a$$

wherein L is a cyclopentadienyl containing ring, M is a group IV, V or VI transition metal, R is a hydrocarbyl, alkoxy, silyl, siloxy group or a halogen or two carbon atoms joined together to form a part of a $C_4$ to $C_6$ ring; A is a halogen, D is a hydrocarbyl radical, a arylalkyl radical, an alkylidene radical or a hydrocarboxy radical; and T is a radical bridging two L rings, where T contains a carbon, a germanium, a silicon, a phosphorous or a nitrogen atom or combination thereof; r is 2 to 3, b is 0 to 5; s is 2 to 5; d is 0 to 2; a is 0 to 2; and r+d+a is equal to the oxidation state of M.

3. The method of claim 1 wherein said product is formed in the presence of a porous carrier.

4. The method of claim 1 wherein said rings are cyclopentadienyl rings.

5. The method of claim 1 wherein each component is present in an amount greater than about 3 mole percent.

6. The method of claim 1 wherein said rings each have two hydrocarbyl substituents.

7. The method of claim 1 wherein the number of the same or different substituents are equal.

8. The method of claim 1 wherein said substituents of said first and second components are the same and said substituents of said components are bonded to said rings in different positions.

9. The method of claim 1 wherein said product is formed in the presence of or added to a cocatalyst or an activator.

10. The method of claim 9 wherein said cocatalyst or activator is alumoxane or an ionic activator or combination thereof.

11. The method of claim 9 wherein said product is formed in the presence of another transition metal metallocene catalyst component.

* * * * *